United States Patent [19]

Nishioka et al.

[11] Patent Number: 5,107,114
[45] Date of Patent: Apr. 21, 1992

[54] FINE SCANNING MECHANISM FOR ATOMIC FORCE MICROSCOPE

[75] Inventors: Tadashi Nishioka; Takao Yasue; Hiroshi Koyama, all of Itami, Japan

[73] Assignee: Mitsubish Denki Kabushiki Kaisha, Japan

[21] Appl. No.: 685,434

[22] Filed: Apr. 15, 1991

[30] Foreign Application Priority Data

Sep. 14, 1990 [JP] Japan .................................. 2-242603

[51] Int. Cl.$^5$ ............................................. H01J 37/26
[52] U.S. Cl. ........................................ 250/306; 73/105
[58] Field of Search .......................... 250/306; 73/105

[56] References Cited

U.S. PATENT DOCUMENTS

| | | | |
|---|---|---|---|
| 4,724,318 | 2/1988 | Binnig | 250/306 |
| 4,837,445 | 6/1989 | Nishioka et al. | 250/306 |
| 4,880,975 | 11/1989 | Nishioka et al. | 250/306 |
| 4,945,235 | 7/1990 | Nishioka et al. | 260/306 |
| 4,947,042 | 8/1990 | Nishioka et al. | 260/306 |
| 4,987,303 | 1/1991 | Takase | 250/306 |

OTHER PUBLICATIONS

Marti et al., "Atomic Force Microscopy Of Liquid-Covered Surfaces: Atomic Resolution Images", Applied Physics Letters, vol. 51, No. 7, Aug. 1987, pp. 484–486.
Marti et al., "Atomic Resolution Atomic Force Microscopy Of Graphite And The 'Native Oxide' On Silicon", Journal of Vacuum Science Technology, vol. 6, No. 2, Apr. 1988, pp. 287-290.
Bryant et al., "Scanning Tunneling And Atomic Force Microscopy Combined", Applied Physics Letters, vol. 52, No. 26, Jun. 1988, pp. 2233-2235.
Bryant et al., "Scanning Tunnelling And Aromic Corce Microscopy Performed With The Same Probe In One Unit", Journal of Microscopy, vol. 152, Part 3, Dec. 1988, pp. 871-875.
Durig et al., "Near-Field Optical-Scanning Microscopy", Journal of Applied Physics, vol. 59, No. 10, May 1986, pp. 3318-3327.
Stern et al., "Deposition And Imaging Of Localized Charge On Insulator Surfaces Using A Force Microscope", Applied Physics Letters, vol. 53, No. 26, Dec. 1988, pp. 2717-2719.
Terris et al., "Contact Electrification Using Force Microscopy", Physical Review Letters, vol. 63, No. 24, Dec. 1989, pp. 2669-2672.

Primary Examiner—Jack I. Berman
Attorney, Agent, or Firm—Leydig, Voit & Mayer

[57] ABSTRACT

A fine scanning mechanism for an atomic force microscope includes a three-dimensionally displaceable cylindrical piezolectric element, a first probe attaching portion attached to an end of the said cylindrical piezoelectric element, a first probe attached to the first probe attaching portion, a bimorph piezoelectric element attaching portion attached to the end of the cylindrical piezoelectric element, a one-dimensionally displaceable bimorph piezoelectric element attached to the bimorph piezoelectric element attaching portion, a cantilever attaching portion attached to a side of the one-dimensionally displaceable bimorph piezoelectric element, the cantilever having a displacement portion and being attached to the cantilever attaching portion, a second probe attaching portion attached to a side of the displacement portion of the cantilever, a second probe attached to the second probe attaching portion, and a stationary sample tray disposed opposite the second probe.

16 Claims, 27 Drawing Sheets

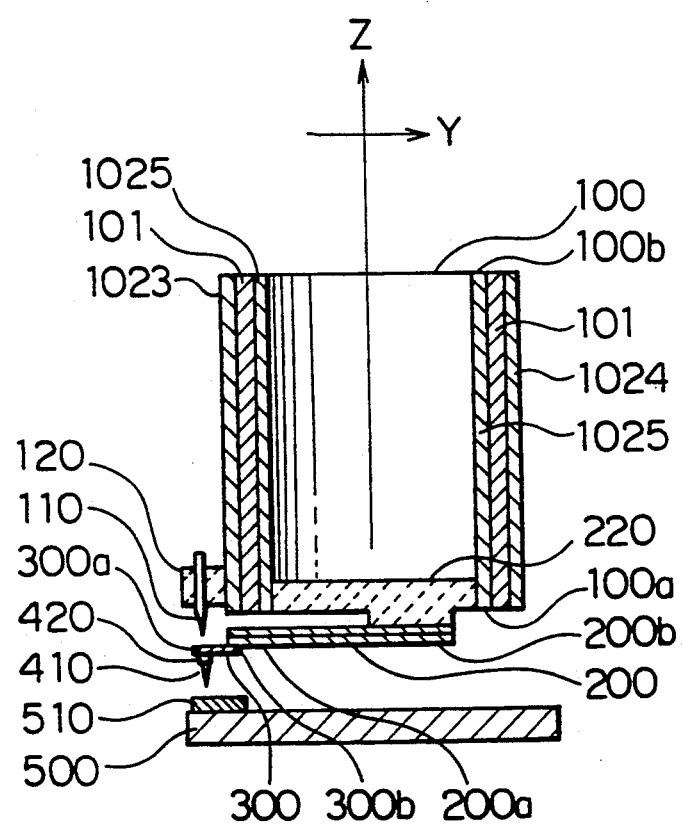

FIG. IE
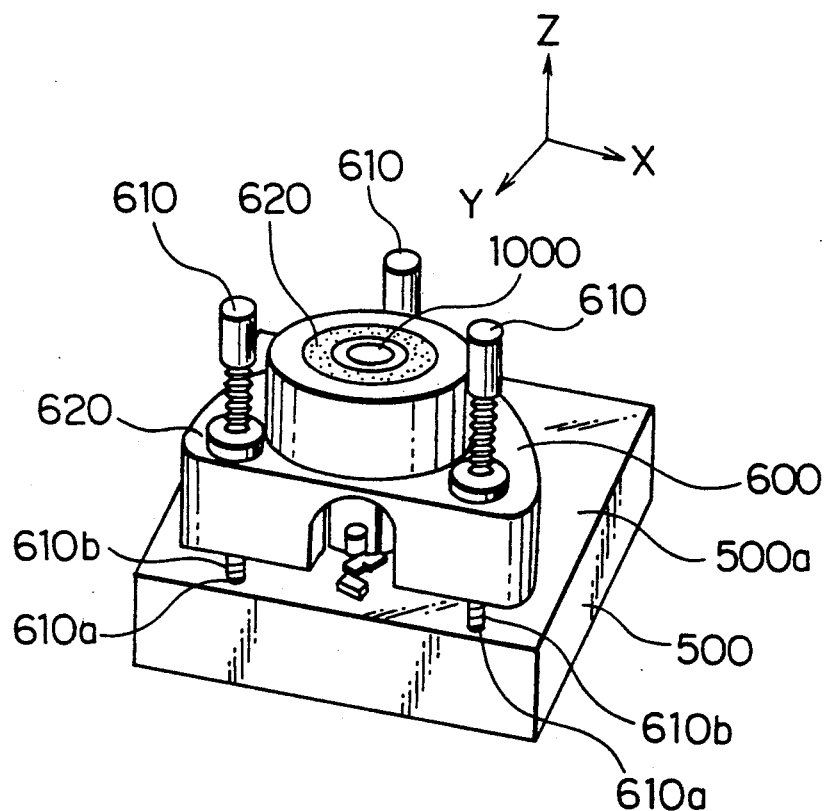

FIG. IF
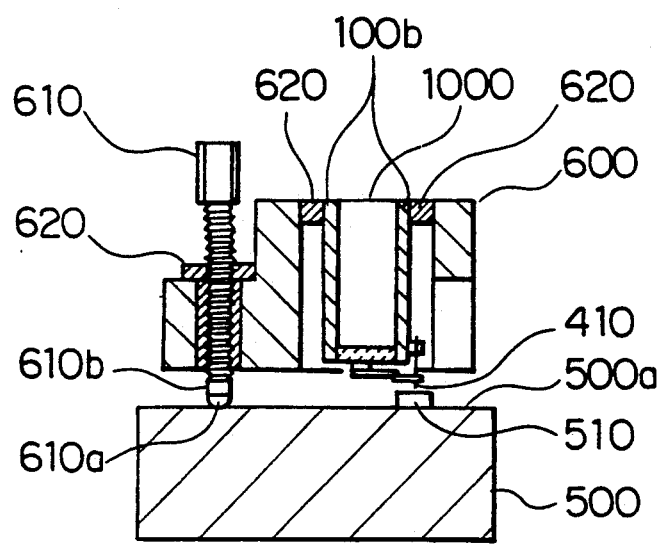

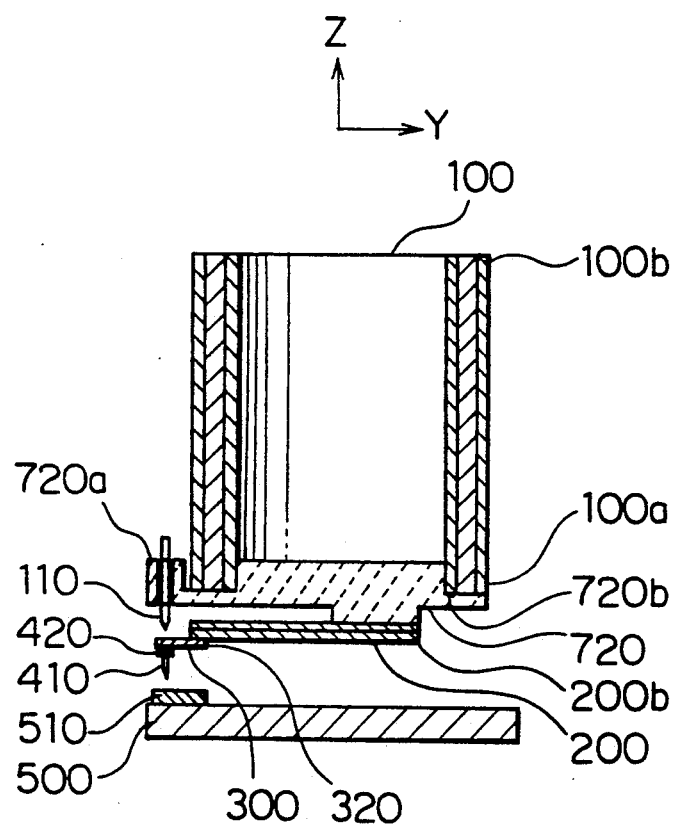

FINE SCANNING MECHANISM FOR ATOMIC FORCE MICROSCOPE

BACKGROUND OF THE INVENTION

1. Field of the Invention

The present invention relates to a fine scanning mechanism for an atomic force microscope (to be abbreviated to "AFM" hereinafter). More particularly, the present invention relates to a fine scanning mechanism which uses a cylindrical piezoelectric element which can be displaced three-dimensionally (XYZ) and a bimorph piezoelectric element which can be displaced one-dimensionally (Z).

2. Description of the related Art

It is preferable that a fine scanning mechanism for an AFM comprises a cylindrical piezoelectric element which can be easily manufactured because its shape is simple, which reveals improved rigidity and which can be threedimensionally displaced. As an alternative to this, it is suitable to employ a bimorph piezoelectric element because it is able to produce a large displacement with a low voltage and it can be one-dimensionally displaced.

Hitherto, as the fine scanning mechanism which employs the cylindrical piezoelectric element which can be threedimensionally displaced or the bimorph piezoelectric element which can be one-dimensionally displaced, the following structures have been available:

(1) A structure for an AFM which employs a cylindrical piezoelectric element for three-dimensionally displacing a sample and which has been disclosed in O.Marti, B.Drake and P.K.Hansma; Appl. Phys. Lett., Vol. 51, No. 7, pp. 484–486 (1987) and O.Marti, B.Drake, S.Gould and P.K.Hansma; J. Vac. Sci. Technol. A, Vol. 6, No. 2, pp. 287–290 (1988);

(2) A structure for an AFM which employs a cylindrical piezoelectric element for three-dimensionally displacing a probe and which has been disclosed in P.J.Bryant, R.G.Miller and R.Yang; Appl. Phys. Lett., Vol.52, No.26, pp.2233–2235 (1988) and P.J.Bryant, R.G.Miller, R.Deeken, R.Yang and Y.C.Zheng; Journal of Microscopy, Vol. 152, Pt 3, pp.871–875 (1988);

(3) A fine scanning mechanism which employs a bimorph piezoelectric element which can also be used in a fine scanning mechanism for the AFM, which is used in, for example, a near-field optical-scanning microscope (NFOM) and which has been disclosed in U.Durig, D.W.Pohl and F.Rohner; J. Appl. Phys., Vol.59, No.10, pp.3318-3327 (1986); and (4) A fine scanning mechanism for an AFM for observing the discharge distribution image by applying microvibrations to the probe by using a bimorph piezoelectric element and which has been disclosed in J.E.Stern, B.D.Terris, H.J.Mamin and D.Rugar; Appl. Phys. Lett., Vol.53, No.26, pp.2717–2719 (1988) and B.D.Terris, J.E.Stern, D.Rugar and H.J.Mamin; Phys. Rev. Lett. Vol.63, No.24, pp. 2669–2672 (1989). The above-described fine scanning mechanisms are shown in FIGS. 9A.to 9E.

The fine scanning mechanism shown in FIG. 9A comprises: a cylindrical piezoelectric element 100 to which a sample tray 500, on which a sample 510 is placed, is secured; a cantilever 300 having a second probe 410 composed of, for example, a diamond stylus; and a first probe 110 made of, for example, metal and acting to detect the deflection of the cantilever 300. The distance between the first probe 110 and the cantilever 300 can be adjusted by a fine adjustment screw 311. The first probe 110, the cantilever 300 and the fine adjustment screw 311 are provided for a lever holder 312. The cylindrical piezoelectric element 100 is composed of a cylindrical piezoelectric material 101 and an electrode 102. The electrode 102 is composed of four sections of electrodes 1021, 1022, 1023 and 1024 formed on the outer surface of the cylindrical piezoelectric material 101 parallel to the axis of cylinder and another electrode 1025 formed on the entire inner surface of the cylindrical piezoelectric material 101. When triangular voltages $Vx+$, $Vx-$, $Vy+$ and $Vy-$ are applied to the electrodes 1021, 1022, 1023 and 1024 and as well as voltage $Vz$ for Z-directional scanning is applied to the electrode 1025, the second probe 410 three-dimensionally scans the surface of the sample 510 attached to the sample tray 500. The deflection of the cantilever 300 that takes place due to atomic force acting between the second probe 410 and the surface of the sample 510 when the above-described three-dimensionally scanning is performed is detected by the first probe 110.

The fine scanning mechanism shown in FIG. 9B comprises: a cylindrical piezoelectric element 100 to which a first probe 110 made of, for example, metal, a cantilever 300 and a second probe 410 made of, for example, metal are attached; and the sample tray 500. When the cylindrical piezoelectric element 100 threedimensionally scans the sample similarly to the fine scanning mechanism shown in FIG. 9A, the first probe 110, the cantilever 300 and the second probe 410 act in a synchronized manner so that the second probe 410 three-dimensionally scans the surface of the sample 510 attached to the sample tray 500. Thus, the three-dimensionally scanning fine scanning mechanism for an AFM is realized.

The fine scanning mechanism shown in FIGS. 9C and 9D comprises a bimorph piezoelectric element 200; a sample tray 500 attached to the bimorph piezoelectric element 200; and a second probe 410 manufactured by applying aluminum to, for example, a diamond or crystal chip the front portion of which is sharpened. The bimorph piezoelectric element 200 is composed of bimorph piezoelectric elements 2001, 2002, 2003, 2004 and 2005. The defection the piezoelectric elements 2001 and 2002 creates an X-directional displacement, while the deflection of the piezoelectric elements 2003 and 2004 creates a Y-directional displacement. As a result, the sample 510 attached to the sample tray 500 is two-dimensionally scanned. Furthermore, a Z-directional displacement is given to the second probe 410 by the deflection of the piezoelectric element 2005 so that the surface of the sample 510 is three-dimensionally scanned. Thus, a fine scanning mechanism for a NFOM is constituted. Since the above-described fine scanning mechanism is able to perform the three-dimensional scanning operation, it can be applied as the fine scanning mechanism for the AFM.

The fine scanning mechanism shown in FIG. 9E comprises the sample tray 500 which can be three-dimensionally scanned; and the bimorph piezoelectric element 200 for vibrating the second probe 410 made of metal with respect to the position of the sample 510 attached to the sample tray 500. Thus, a fine scanning mechanism for an AFM is constituted which is capable of observing a charge distribution image in such a manner that an optical beam reflected from the second probe 410 is received by a sensor 20 via an optical fiber 10.

However, the above-described conventional fine scanning mechanisms encounter the following problems:

The fine scanning mechanism 1000 shown in FIG. 9A encounters a problem in that the size of the sample tray 500 attached to the cylindrical piezoelectric element 100 is limited by the diameter of the cylindrical piezoelectric element 100. Therefore, if the sample 510 has a large size, it cannot be observed by the AFM. What is worse, since the piezoelectric material 101 forming the cylindrical piezoelectric element 100 suffers from poor mechanical rigidity, there arises a risk that the cylindrical piezoelectric element 100 can be damaged when the sample 510 is attached to the sample tray 500. Therefore, the sample 510 cannot easily be attached/detached from the sample tray 500.

The fine scanning mechanism shown in FIG. 9B causes difficulty in presetting, adjustment and setting operations so as to make the distance between the first probe 110 and the cantilever 300 fall within the tunnel region. The distance between the first probe 110 and the cantilever 300 in the tunnel region is an extremely short distance, on the order of 10 angstrom. In consequence, the initial adjustment work cannot easily be completed. Furthermore, it is very difficult to perform re-adjustment operation if the distance has been changed in accordance with a lapse of time or after the first probe 110 has been changed because the first probe 110 had made contact with the cantilever 300.

The fine scanning mechanism shown in FIGS. 9C and 9D have a problem in that the structure is too complicated and it cannot easily be manufactured. What is even worse, the obtainable reproducibility as a fine scanning mechanism is unsatisfactory. Since the sample tray 500 is secured to the displaceable portion of the bimorph piezoelectric element 200, it is difficult to attach the sample 510, and the bimorph piezoelectric element 200 will be deformed or broken when the sample 510 is attached.

The fine scanning mechanism shown in FIG. 9E has a problem similarly to that shown in FIG. 9A since the sample tray 500 must be moved.

That is, the conventional fine scanning mechanisms for an AFM have the following problems: the cylindrical piezoelectric element 100 or the bimorph piezoelectric element 200 will be deformed or broken when the sample 510 is attached; the sample 510 cannot easily be attached or detached from the sample tray 500; it is difficult to set the distance from the first probe 110 to the cantilever 300; and a fine scanning mechanism revealing excellent reproducibility cannot be manufactured.

SUMMARY OF THE INVENTION

Accordingly, the present invention is established to overcome the above-described problems, and an object of the present invention is therefore to provide a reliable fine scanning mechanism for an AFM which can be easily manufactured, which can be easily operatdd and in which the sample is not limited by the dimensions of the apparatus.

A fine scanning mechanism for an AFM according to the present invention comprises: a cylindrical piezoelectric element; a first probe attaching portion attached to the side of a three-dimensionally displaceable portion of the cylindrical piezoelectric element; a first probe attached to the first probe attaching portion; a displacement bimorph piezoelectric element attaching portion attached to the side of the three-dimensionally displaceable portion of the cylindrical piezoelectric element; a displacement bimorph piezoelectric element attached to the displacement bimorph piezoelectric element attaching portion; a cantilever attaching portion attached to a side of the onedimensionally displaceable portion of the displacement bimorph piezoelectric element; a cantilever attached to the cantilever attaching portion; a second probe attaching portion attached to a side of the distorted displacement portion of the cantilever; a second probe attached to the second probe attaching portion; and a stationary sample tray disposed opposite the second probe.

According to the present invention, when a voltage for the three-dimensional displacement is applied to the cylindrical piezoelectric element, the first probe secured to the cylindrical piezoelectric element, the bimorph piezoelectric element, the cantilever and the second probe act in synchronization with one another. In consequence, the second probe three-dimensionally scans the surface of the sample held on the stationary sample tray. When a voltage for the one-dimensional displacement is applied to the bimorph piezoelectric element, the distance from the first probe to the cantilever can be set within be the tunnel region.

BRIEF DESCRIPTION OF THE DRAWINGS

FIGS. 1A and 1B are respectively perspective and cross sectional views which illustrate a first embodiment of a fine scanning mechanism according to the present invention;

FIGS. 1E and 1F are respectively perspective and cross sectional views which illustrate a rough adjustment mechanism to which the fine scanning mechanism according to the first embodiment is applied;

FIGS. 2A and 2B are respectively perspective and cross sectional views which illustrate a second embodiment of a fine scanning mechanism according to the present invention;

DESCRIPTION OF THE PREFERRED EMBODIMENTS

Preferred embodiments of the present invention will now be described with reference to the drawings.

Figure 1A:
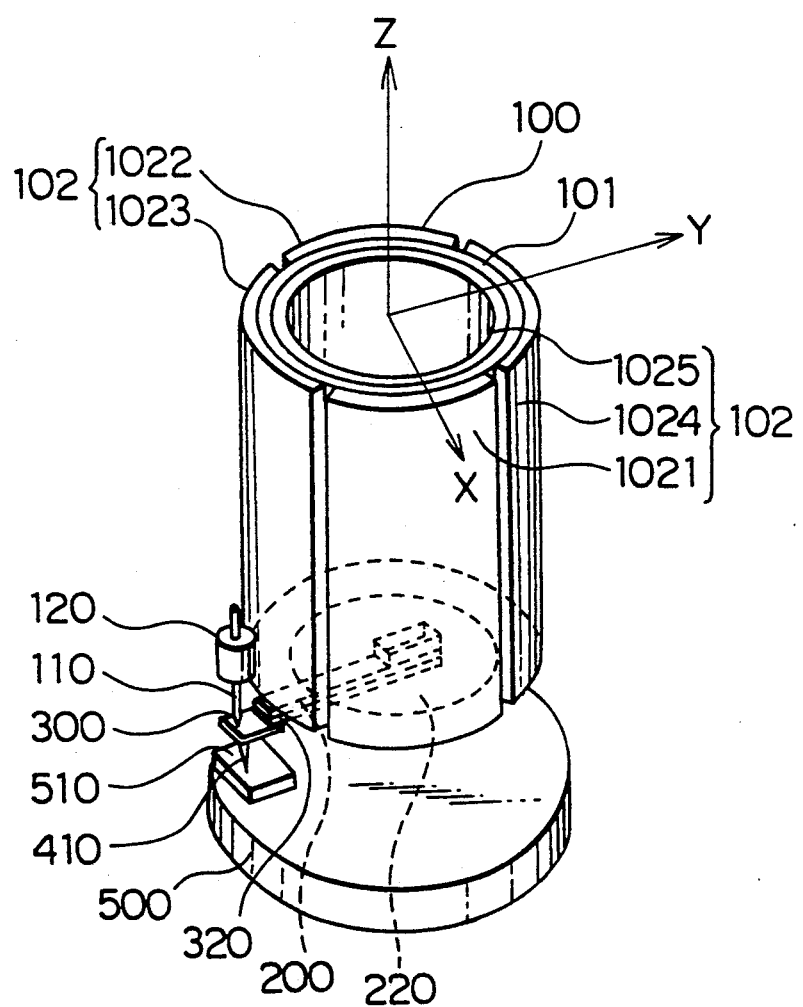

Referring to FIGS. 1A and 1B, a fine scanning mechanism for an AFM according to a first embodiment of the present invention comprises a cylindrical piezoelectric element 100 and a first probe attaching portion 120 secured to a free end 100a of the cylindrical piezoelectric element 100 by, for example, an adhesive. Furthermore, the fine scanning mechanism comprises a first probe 110 attached to the first probe attaching portion 120 and a displacement bimorph piezoelectric element 200 an end 200b of which is secured to the free end 100a of the cylindrical piezoelectric element 100. The fine scanning mechanism further comprises a cantilever attaching portion 320 secured to a free end 200a of the displacement bimorph piezoelectric element 200 by, for example, an adhesive. The fine scanning mechanism further comprises a cantilever 300 an end 300b of which is secured to the cantilever attaching portion 320 by, for example, an adhesive. The fine scanning mechanism further comprises a second probe attaching portion 420 secured to a free end 300a of the cantilever 300 by, for example, an adhesive. The fine scanning mechanism further comprises a second probe 410 attached to the second probe attaching portion 420 and a sample tray 500 disposed opposite the second probe 410 in a stationary manner.

The cylindrical piezoelectric element 100 is composed of a cylindrical piezoelectric material 101 and an electrode 102. The electrode 102 includes four electrodes 1021, 1022, 1023 and 1024, which are sectioned parallel to the axis of the cylinder and formed on the outer surface of the cylindrical piezoelectric material 101, and an electrode 1025 formed on the entire inner surface of the piezoelectric material 101. The piezoelectric material 101 is subjected to a polarization treatment which utilizes a transverse effect mode which causes the direction from the inner surface toward the outer surface to be the direction of the polarization and the direction of deflection and the direction of the polarization to be perpendicular to each other. The free end 100a of the cylindrical piezoelectric element 100 is two-dimensionally displaced when the electrodes 1021, 1022, 1023 and 1024 are operated by triangular voltages $Vx+$, $Vx-$, $Vy+$ and $Vy-$ applied thereto. Furthermore, the above-described free end 100a is also one-dimensionally displaced in direction Z when the electrode 1025 is operated by a feedback voltage $Vz$ applied thereto. In consequence, the free end 100a of the cylindrical piezoelectric element 100 is three-dimensionally displaced with respect to a fixed end 100b of the cylindrical piezoelectric element 100.

The first probe 110 attached to the first probe attaching portion 120 is three-dimensionally displaced in synchronization with the movement of the free end 100a of the cylindrical piezoelectric element 100. The end of the first probe 110 is arranged opposite the top surface of the cantilever 300 adjacent to the free end 300a of the cantilever 300. A bias voltage is applied between the first probe 110 and the cantilever 300.

Figure 1C:
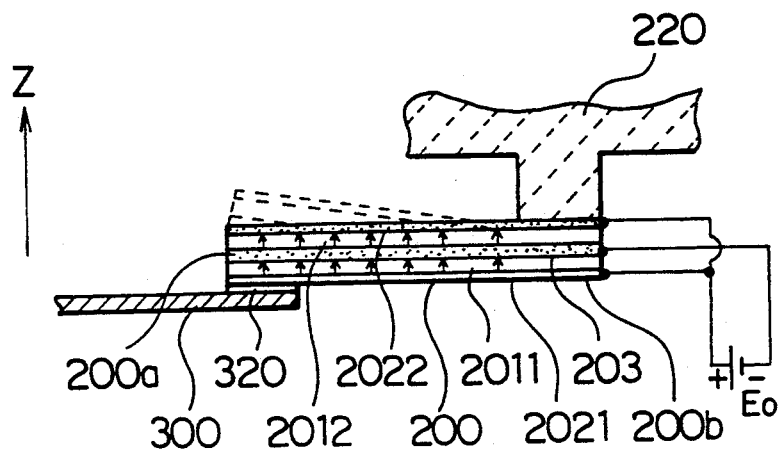
FIG. 1C is a partially enlarged cross sectional view which illustrates the first embodiment.

The displacement bimorph piezoelectric element 200 is attached to a displacement bimorph piezoelectric element attaching portion 220 secured to the free end 100a of the cylindrical piezoelectric element 100 so as to be threedimensionally displaced in synchronization with the free end 100a of the cylindrical piezoelectric element 100. For example, a parallel type bimorph piezoelectric element as shown in FIG. 1C is used as the displacement bimorph piezoelectric element 200. Piezoelectric material layers 2011 and 2012 are placed on the two sides of an elastic plate 203, with the piezoelectric material 2011 having an electrode 2021 formed thereon. The other piezoelectric material 2012 has an electrode 2022 formed thereon. As designated by the arrows of FIG. 1C, the piezoelectric materials 2011 and 2012 are respectively subjected to the polarization treatment by utilizing a transverse effect mode in which the direction of polarization of the piezoelectric material 2011 is in a direction from the electrode 2021 toward the elastic plate 203 and the direction of polarization of the piezoelectric material 2012 is arranged in a direction from the elastic plate 203 toward the electrode 2022, and the direction of distortion and the polarization direction are perpendicular to each other.

When electrodes 2021 and 2022 are electrically connected to each other and a voltage $EO$ applied with the electrically connected electrodes 2021 and 2022 at a positive potential and the elastic plate 203 at a negative potential, the free end 200a of the displacement bimorph piezoelectric element 200 is one-dimensionally displaced in direction Z with respect to the fixed end 200b as designated by a dashed line of FIG. 1C. Therefore, the free end 200a of the displacement bimorph piezoelectric element 200 is displaced by a quantity determined by combining the quantity of the three-dimensional displacement of the free end 100a of the cylindrical piezoelectric element 100 and the quantity of the one-dimensional displacement of the displacement bimorph piezoelectric element 200 with respect to the fixed end 100b of the cylindrical piezoelectric element 100. The fixed end 200b of the displacement bimorph piezoelectric element 200 is, by an adhesive or the like, secured to in the vicinity of the central portion of the displacement bimorph piezoelectric element attaching portion 220, the portion corresponding to a position on the cylindical axis of the cylindrical piezoelectric element 100.

Electric connection members such as electric lead wires and soldering elements provided for the purpose of applying operating voltages to the electrodes 102, 202! and 2022 and the elastic plate 203 and applying bias voltages to the first probe 110 and the cantilever 300 are omitted from the illustration.

As shown in FIG. lC, the cantilever attaching portion 320 is secured to the free end 200a of the displacement bimorph piezoelectric element 200. Furthermore, the end 300b of the cantilever 300 is attached to the cantilever attaching portion 320. Therefore, the distance from the free end 300a of the cantilever 300 and the first probe 110 is adjusted by the one-dimensional displacement of the displacement bimorph piezoelectric element 200 when the voltage E is applied to the displacement bimorph piezoelectric element 200. The cantilever 300 has a spring constant K: which denotes the deflection due to atomic force acting between the free end 300a of the cantilever 300 and the first probe 110. The spring constant K: is determined to be a value which is considerably smaller than spring constant Kz of the displacement bimorph piezoelectric element 200.

The second probe 410 is attached to the second probe attaching portion 420 secured to the free end 300a of the cantilever 300. The end of the second probe 410 is positioned opposite the surface of a sample 510 placed on the sample tray 500. In a case where the distance between the second probe 410 and the sample 510 is enlarged, that is, in a case where the cantilever 300 is not deflected and the quantity of the onedimensional displacement of the free end 200a of the displacement bimorph piezoelectric element 200 with respect to the fixed end 200b is constant, the second probe 410 is displaced in the same manner as the three -L dimensional displacement of the free end 100a of the cylindrical piezoelectric element 100 with respect to the fixed end 100b of the same.

Then, the operation of the fine scanning mechanism for an atomic force microscopy according to this embodiment will be described. First, voltage V, which causes the distance between the free end 300a of the cantilever 300 and the first probe 110 to be within the tunnel region in which a predetermined level tunneling current flows, is applied to the displacement bimorph piezoelectric element 200 while measuring the tunneling current where the atomic force between the second probe 410 and the sample 510 can be neglected and the cantilever 300 has no deflection. Subsequently, the voltage applied to the displacement bimorph piezoelectric element 200 is changed by quantity V the quantity $\Delta V$ corresponding to a change $\Delta L$ in the distance between the free end 300a of the cantilever 300 and the first probe 110 when the cantilever 300 is deflected due to the atomic force which acts between the second probe 410 and the sample 510. That is, applied voltage V becomes V =VO +$\Delta V$. The plus and minus signs of the change quantities $\Delta L$ and $\Delta V$ are determined so as to cause the distance between the free end 300a of the cantilever 300 and the first probe 110 to be enlarged when the atomic force acting between the second probe 410 and the sample 510 is a repulsive force.

Subsequently, a triangular voltage is applied to the cylindrical piezoelectric element 100 while maintaining the voltage applied to the displacement bimorph piezoelectric element 200 at a constant voltage. In consequence, the free end 100a of the cylindrical piezoelectric element 100, the free end 200a of the displacement bimorph piezoelectric element 200, the free end 300a of the cantilever 300 and the first and second probes 110 and 410 act in synchronization with one another. However, the second probe 410 two-dimensionally scans the surface of the sample 510 fastened to the stationary sample tray 500 since the voltage V applied to the displacement bimorph piezoelectric element 200 is constant.

When the distance between the second probe 410 and the sample 510 is shortened from the above-described status, an atomic force acts between the second probe 410 and the sample 510. As a result, the cantilever 300 deflects, causing a tunneling current to flow between the free end 300a of the cantilever 300 and the first probe 110. Since the level of the tunneling current depends upon the projections and pits of the surface of the sample 510, the of change in the tunneling current is amplified so as to be converted into voltage change $\Delta Vz$. Then, feedback voltage $Vz + \Delta Vz$ is applied to the electrode 1025 of the cylindrical piezoelectric element 100. In consequence, the quantity of displacement of the free end 100a of the cylindrical piezoelectric element 100 in the direction Z is changed. Since the one-dimensional displacements of the free end 200a of the displacement bimorph piezoelectric element 200, the free end 300a of the cantilever 300 and the first and second probes 110 and 410 in the direction Z are synchronized, the distance between the second probe 410 and the sample 510 is changed. Thus, the deflection that takes place in the cantilever 300 is converted into a change $\Delta L$ in the predetermined distance between the free end 300a of the cantilever 300 and the first probe 110. As a result, the feedback causing the tunneling current to be a predetermined level, that is, the feedback causing the atomic force to be maintained at a predetermined value is achieved.

Therefore, the XY coordinates corresponding to the triangular voltages $Vx+$, $Vx-$, $Vy+$ and $Vy-$ applied to the electrodes 1021, 1022, 1023 and 1024 and Z coordinate corresponding to the voltage change quantity $\Delta Vz$ applied to the electrode 1025 form an AFM image which is the reflection of the projections and pits of the surface of the sample 510.

Figure 1D:
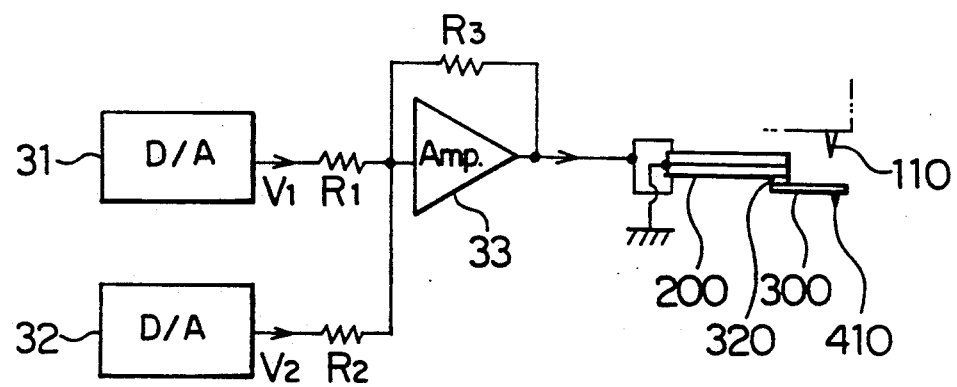
FIG. 1D is a block diagram for an electric circuit for operating the structure according to the first embodiment.

Then, a method of operating the displacement bimorph piezoelectric element 200 will be described. For instance, as shown in FIG. 1D, digital-to-analog (D/A) converters 31 and 32, which are respectively controlled by computers, are connected to an operational amplifier circuit 33 via resistors R1 and R2, respectively. Furthermore, a resistor R3 is connected in parallel with the operational amplifier circuit 33. The resistance value of each of the resistors R1, R2 and R3 is determined so that the outputs from the two D/A converters 31 and 32 are summed at different voltage amplification rates. The quantity of displacement per unit of voltage applied is about 2.5 angstrom/mV in a case where the displacement of the bimorph piezoelectric element 200 for a voltage of 60 V is 15 $\mu$m and the maximum voltage to be applied is 150 V. Therefore, if a structure is arranged in such a manner that a 16-bit converter the maximum output voltage V1 of which is $\pm 10V$ is employed as each of the D/A converters 31 and 32, the voltage amplification of the output from the D/A converter 31 is 15 and the output voltage V1 from the D/A converter 31 is changed by in units of 1 mV, the voltage output from the operational amplifier circuit 33 can be varied up to 150 V in units of 15 mV. That is, the displacement bimorph piezoelectric element 200 can be displaced up to 37.5 $\mu$m in units of 37.5 angstrom. On the other hand, if a structure is arranged in such a manner that the voltage amplification rate of the output from the D/A converter 32 is 1/15 and the output voltage Vz from the D/A converter 32 is changed in units of 1 mV, the voltage output from the operating voltage amplifying circuit 33 can be varied up to 0.667 V in units of 1/15 mV. That is, the displacement bimorph piezoelectric element 200 can be displaced up to 0.167 μm in units of 0.167 angstrom. Therefore, the displacement of the free end 200a of the displacement bimorph piezoelectric element 200 can be satisfactorily controlled in the tunnel region in units of 10 angstrom by summing outputs from the D/A converters 31 and 32 before the sum is amplified by the operational amplifier circuit 33.

The fine scanning mechanism for an AFM is used, for example, in combination with a rough adjustment mechanism 600 as shown in FIGS. 1E and 1F. A fine scanning mechanism 1000 is attached to, for example, the rough adjustment mechanism 600 of a three point supported type, the fine scanning mechanism 1000 being placed on a stationary tray 500 together with the rough adjustment mechanism 600. The rough adjustment mechanism 600 has, at the central portion thereof, a through hole pressing from its upper surface to the lower surface thereof with the fine scanning mechanism 1000 disposed in the above-described through hole. The fine scanning mechanism 1000 is secured within the through hole with the fixed end 100b of the cylindrical piezoelectric element 100 secured by an adhesive via a fixing ring 620 made of an electrically insulating material such as quartz. The rough adjustment mechanism 600 has three screws 610 inserted from the upper surface to the lower surface of the rough adjustment mechanism 600.

Figure 1G:
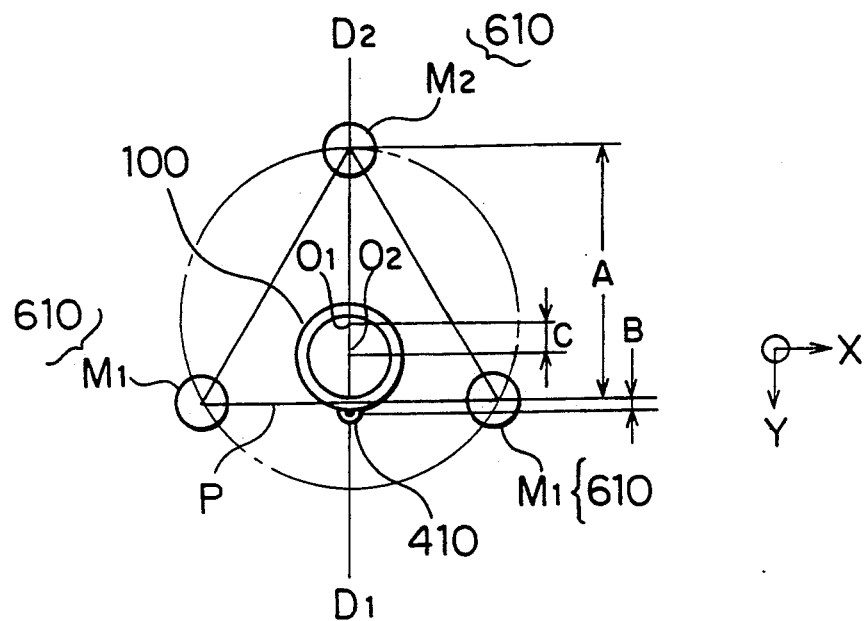
FIGS. 1G and 1H which respectively illustrate the rough adjustment mechanism shown in FIG. 1E.

The above-described three screws 610 are positioned on a plane (XY plane) so as to form an equilateral or isosceles triangle as shown in FIG. 1G. It is assumed that the two screws 610 positioned at the two ends of the isosceles triangle or the equilateral triangle formed by the three screws 610 are respectively M: and the other screw 610 is Mz. The central point 0z of the piezoelectric element 100, that is, the central point of the displacement bimorph piezoelectric element attaching portion 220 and the second probe 410 are positioned on straight line D:-Dz drawn to pass through the screw Mz and perpendicular to the base P of the isosceles triangle. In particular, the second probe 410 is positioned away from the base P of the isosceles triangle by small distance B. The front portions of the screws 610 projecting over the lower surface of the rough adjustment mechanism 600 are positioned to make contact with a surface 500a of the sample tray 500 on which the sample is placed. The piezoelectric element 100 and the second probe 410 of the fine scanning mechanism 1000 are positioned above the surface 500a of the sample tray 500. The length of each of the screws 610 projecting over the lower surface of the rough adjustment mechanism 600 can be adjusted by rotating the corresponding screws 610.

Figure 1H:
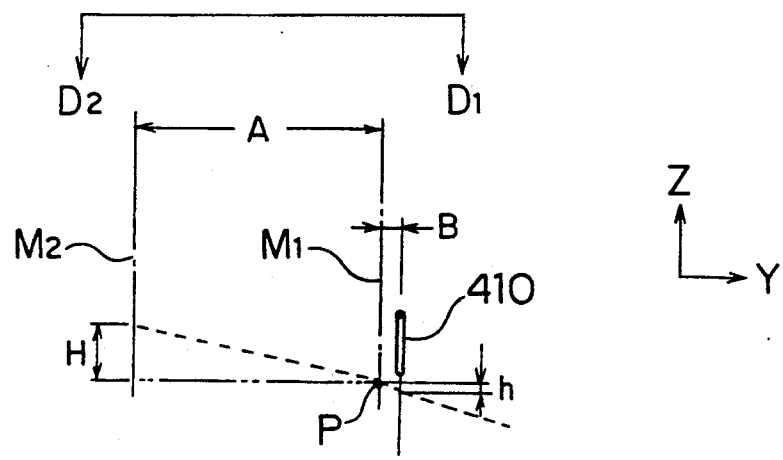

In order to position the front portion of the second probe 410 in such a manner that it does not make contact with the sample while maintaining a proper distance, the height of each of the three screws 610 must be previously adjusted. When the screw Mz is subsequently rotated, the front portion of the second probe 410 approaches to the surface of the sample 510. As shown in FIG. 1G, the second probe 410 is positioned away from the base P of the triangle formed by the three screws 610 by the distance B. Therefore, as shown in a vertical planar relationship drawing FIG. 1H, when an assumption is made that the distance from the above-described base P to the screw Mz is A (>B), the second probe 410 moves vertically h which is a value obtained by reducing, at a magnification of substantially B/A, the vertical difference H given by rotating the screw Mz while the base P connecting the two screws M1 serves as a supporting point. The thus realized reduction ratio is determined by distance C, shown in FIG. 1G, between center O1 of the rough adjustment mechanism 600 and the center O2 of the cylindrical piezoelectric element 100 to which the second probe 410 is attached. Therefore, a desired reduction ratio can be set when the rough adjustment mechanism 600 is manufactured.

The second probe 410 and the sample 510 approach each other by a certain degree by using the three screws 610 of the rough adjustment mechanism 600 when the atomic force acting between the second probe 410 and the sample 510 is small enough to be neglected and deflection does not take place in the cantilever 300. Subsequently, a bias voltage for measuring the tunneling current is applied between the first probe 110 and the cantilever 300. Furthermore, a voltage is applied to the displacement bimorph piezoelectric piezoelectric element 200, the voltage corresponding to the deflection of the cantilever 300 which causes the tunneling current of a predetermined value to flow between the free end 300a of the cantilever 300 and the first probe 1!0 when the atomic force acts as described above. The thus applied voltage is maintained at a predetermined level. Then, the triangular voltage is applied to the cylindrical piezoelectric element 100 so that the second probe 410 two-dimensionally scans the XY surface of the sample 510 attached to the stationary sample frame 500.

Then, the screw M2 is rotated so as to make the second probe 410 and the sample 510 further approach each other. As a result, the atomic force acts between the second probe 410 and the sample 510 causing deflection to take place in the cantilever 300. When the level of the tunnel current flowing between the first probe 110 and the cantilever 300 is raised to a predetermined level, the feedback circuit is operated. In consequence, the feedback voltage is applied to the electrode 1025 so as to maintain the tunneling current at a predetermined level, that is, the deflection in the cantilever 300 is maintained at a constant degree if there are projections and pits in the surface of the sample 510. As a result, the Z directional motion of the free end 100a of the cylindrical piezoelectric element 100 is controlled. When the quantity of scanning in the XY plane and the quantity of feedback in the direction Z are displayed by a display device, the surface image of the sample 510 imaged by the AFM can be displayed.

As described above, the fine scanning mechanism 1000 according to the first embodiment is arranged in such a manner that the sample 510 is attached to a stationary sample tray 500. Therefore, the size of the sample 510 to be observed is not limited by the cylindrical piezoelectric element 100. Furthermore, the cylindrical piezoelectric element 100 and the bimorph piezoelectric element 200 can be protected from damage and breakage when the sample 510 is attached to the sample tray 500. In addition, the sample 510 can be easily be attached or detached from the sample tray 500, and the distance between the first probe 110 and the cantilever 300 can easily be determined.

The material and dimensions of the fine scanning mechanism 1000 and the rough adjustment mechanism 600 therefor according to the first embodiment will be described in detail.

The cylindrical piezoelectric element 100 is, for example, arranged in such a manner that the length is 80 mm, the inner diameter is 10.6 mm, the outer diameter is 12.8 mm and the quantities of displacement in the directions X, Y, and Z for a unit voltage applied are about 200 and 100 angstroms V, respectively.

The dimensions of the displacement bimorph piezoelectric element 200 are arranged in such a manner that the clamp portion is 5 mm, the thickness is 0.53 mm, the overall length is 10 mm, the width is 2 mm, the force at an applied voltage of 60 V is 35 g, the displacement for a voltage of 60 V applied is 15 $\mu$m and the maximum applied voltage is 150 V. The elastic plate 203 comprises a phosphor bronze (Sn: 2 to 8 %, P: 0.2 %, Cu: 91.8 to 97.8%) wherein the thickness is 0.12 mm, the overall length is 10 mm and width is 2 mm. The thickness of each of the piezoelectric materials is 0.2 mm.

Each of the piezoelectric materials 101, 2011 and 2012 for the cylindrical piezoelectric element 100 and the displacement bimorph piezoelectric element 200 is lead titanate lead zirconate (Pb(Zr-Ti)0:) which is the piezoelectric material having an electrostriction constant $d31 = -200 \times 10^{12}$ m/V and a Curie temperature of about 200° C. The electrodes 102, 2021 and 2022 are formed to have a thickness of about 3 $\mu$m by printing silver (Ag) or electroless plating of nickel (Ni). The spring constant K2 of the displacement bimorph piezoelectric element 200 is 12800 N/m.

The hysteresis and creep of the displacement bimorph piezoelectric element 200 which will change the tunnel current after a lapse of time and deteriorate the reproducibility of the voltage to be applied in the tunnel region can be reduced by a power source circuit for a piezoelectric element disclosed in, for example, C.V.Newcomb and I.Flinn; Electron. Lett., Vol.18, No. 11, pp.422-424 (1982) or by a charge control system realized by connecting a piezoelectric element in series to a capacitor and disclosed in H.Kaizuka nd Byron Siu; Jpn. J. Appl. Phys., Vol.27, Part 2. No.5, pp.L773-776 (1988).

The first probe 110 is manufactured by sharpening the front portion of a wire having a diameter of 0.25 mm and made of tungsten (W) or a platinum-iridium alloy (Pt: 90%, Ir: 10%) by machining or electropolishing, the first probe 110 being fastened to the free end 100a of the cylindrical piezoelectric element 100.

The first probe attaching portion 120 and the displacement bimorph piezoelectric attaching portion 220 are respectively made of a machinable ceramic (SiOz: 46%, Al2O3: 16%, MgO: 17%, K2O: 10%, F: 4% and B2O3: 7%) which is an isotropic, homogeneous and electrically insulating material which can be subjected to precise and complicated machining.

The cantilever 300 is made of non-magnetic metal having proper rigidity, for example, gold (Au), platinum (Pt), tungsten (W), molybdenum (Mo) or silicon (Si). The size of the cantilever 300 is arranged in such a manner that the width is 250 to 300 $\mu$m, the thickness is 10 to 20 $\mu$m and the length is 500 to 800 $\mu$m in a case where molybdenum (Mo) is employed.

The second probe attaching portion 420 is made of a sintered nickel (Ni) powder with the second probe 410 exposed and the other portion covered.

The second probe 410 is a stylus made of, for example, natural or artificial diamond, the stylus being sufficiently sharpened to detect the atomic force. For instance, the front portion of the second probe 410 is arranged to have a radius of curvature of 0.5 $\mu$m or less.

When the second probe attaching portion 420 having a diameter of 250 $\mu$m and a length of 300 $\mu$m and made of sintered body of nickel (Ni) powder and the second probe 410 made of a conical diamond stylus the bottom of which has a diameter of 250 $\mu$m and height of which is 200 $\mu$m are attached to the free end of the cantilever 300 made of molybdenum (Mo) and arranged to have a width of 280 $\mu$m, a thickness of 10 $\mu$m and a length of 750 $\mu$m, a spring constant K3 = 90 N/m and a resonant frequency of 6 KHz can be realized.

The above-described elements are secured to one another by using a thixotropic epoxy resin for preventing drips and aromatic armine hardening agents when a relatively heavy member is secured. When a relatively light member such as the cantilever 300, the second probe 410 and the like is secured, an adhesive such as cyanoacrylate is used.

As the cantilever attaching portion 320, a machinable ceramic piece which is an electrically insulating material is interposed between the free end 200a of the displacement bimorph piezoelectric element 200 and the fixed end 300b of the cantilever 300 before it is adhered by the adhesive. As an alternative to this, the free end 200a of the displacement bimorph piezoelectric element 200 and the fixed end 300b of the cantilever 300 are directly adhered to each other by the epoxy resin adhesive revealing excellent electrically insulating characteristics and the thus formed adhesive portion is the cantilever attaching portion 320.

The sample tray 500 and the rough adjustment mechanism 600 are mainly made of invar (Fe: 64%, Ni: 36%) having a small thermal expansion coefficient, for example, the thermal expansion coefficient at temperatures of 30 to 100° C. is $2 \times 10^{-6}$/° C. or less, super-invar (Fe: 63%, Ni: 32%, Co: 5%) having a thermal expansion coefficient of $1.3 \times 10^{-6}$/° C. or less at temperature of 30 to 100° C.

The three screws 610 are made of pure iron (Fe) or a material composed of iron and lead (Pb) or sulfur (S) added to iron in order to improve hardness and mechanical characteristics such as the cutting characteristic. As the screws 610, unified fine threads (JIS B 0208) having an outer diameter of ¼ inches, pitch P of 0.3175 mm and 80 threads per inch are used. A front portion 610b of each of the screws 610 has a metal ball 610a in order to reliably establish the three-point support. As the metal balls 610a, ball bearing steel balls (JIS B1501) the L. diameter of each of which is 3/16 inches are used, the metal ball 610a being fitted into the recessed portion at the front end 610b of the screw 610 by caulking. A female collar 620 made of a relatively smooth material, for example, brass (Cu: 70%, Zu: 30%) and threaded corresponding to the three screws 610 disposed in the plane of the rough adjustment mechanism 600 is embedded in the rough adjustment mechanism 600 by press fitting.

Figure 2A:
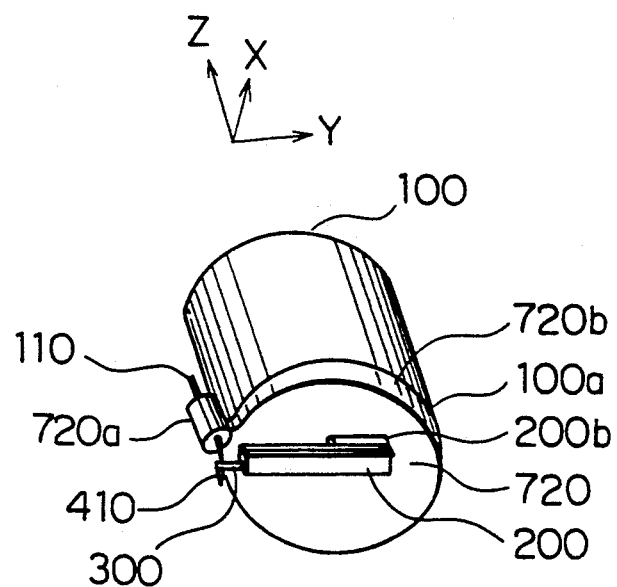

A second embodiment of the fine scanning mechanism according to the present invention will be described with reference to FIGS. 2A and 2B. In the second embodiment, the first probe attaching portion 120 and the displacement bimorph piezoelectric element attaching portion 220 according to the first embodiment are integrated as a first probe and bimorph attaching portion 720 is a continuous disc.

The first probe and bimorph attaching portion 720 comprises a disc-like stationary portion 720b and a first probe holding portion 720a positioned outside the cylindrical piezoelectric element 100. The peripheral portion of the stationary portion 720b is secured to the peripheral portion of the free end 100a of the cylindrical piezoelectric element 100 by, for example, an adhesive. The first probe 110 is attached to the first probe holding portion 720a. A stationary end portion 200b of the displacement bimorph piezoelectric element 200 is secured in the vicinity of the central portion of the stationary portion 720b, corresponding to central portion of the free end 100a of the cylindrical piezoelectric element 100 by, for example, an adhesive. The cantilever attaching portion 320, the cantilever 300, the second probe attaching portion 420 and the second probe 410 are disposed similar to the first embodiment.

The first probe and bimorph attaching portion 720 is manufactured by fine machining by using a machinable ceramic.

According to the second embodiment, a reliable fine scanning mechanism can be easily manufactured. That is, according to the first embodiment, the first probe 110 and the cantilever 300 are coupled to each other via a multiplicity of elements, as shown in FIG. 1B, that is, the first prove attaching portion 120, the electrode 1023, the piezoelectric material 101, the electrode 1025, the displacement bimorph piezoelectric element attaching portion 220, the displacement bimorph piezoelectric element 200 and the cantilever attaching portion 320. However, according to the second embodiment, the same are coupled to each other via a reduced number of elements, as shown in FIG. 2B, that is, the first probe and bimorph attaching portion 720, the displacement bimorph piezoelectric element 200 and the cantilever attaching portion 320. Thus, they are coupled to each other via a simple structure in comparison to the first embodiment. Therefore, aligning of the front portion of the first probe 110 with the cantilever 300 can easily be performed so that the fine scanning mechanism can easily be manufactured. Furthermore, the number of the members made of different materials which are interposed between the first probe 110 and the cantilever 300 is reduced, preventing complicated problems in terms of thermal expansion and vibrations. In consequence, a reliable fine scanning mechanism can be manufactured.

Figure 3:
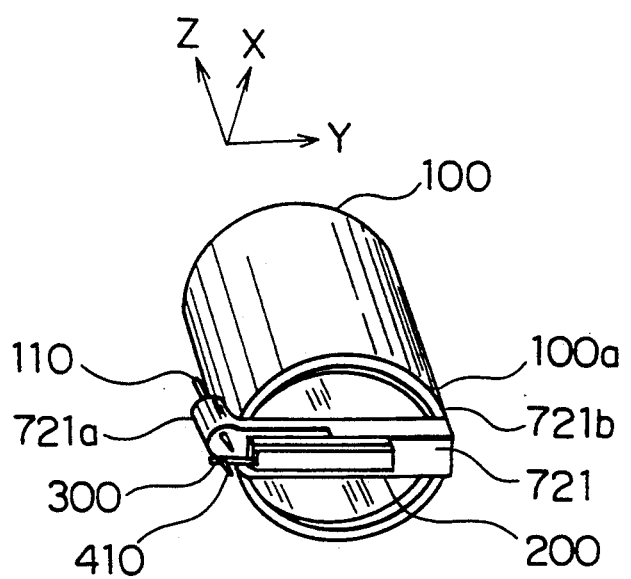
FIG. 3 is a perspective view which illustrates a third embodiment of the fine scanning mechanism.

A third embodiment of the fine scanning mechanism according to the present invention will be described with reference to FIG. 3. According to the third embodiment, a bridge like first probe and bimorph attaching portion 721 made of a continuously formed material is secured to the free end 100a of the cylindrical piezoelectric element 100.

The first probe and bimorph attaching portion 721 comprises a bridge-like stationary portion 721b and a first probe holding portion 721a positioned outside the cylindrical piezoelectric element 100. The stationary portion 721b is secured by, for example, an adhesive so as to link two peripheral portions of the free end 100a via the center of the cylinder of the cylindrical piezoelectric element 100.

According to this embodiment, the weight of the first probe and bimorph attaching portion 721 can be reduced. Furthermore, the length necessary to connect the first probe and bimorph attaching portion 721 to the free end 100a of the cylindrical piezoelectric element 100 can be shortened. Therefore, mechanical distortion, between the first probe and bimorph attaching portion 721 and the cylindrical piezoelectric element 100 when the fine scanning mechanism is operated to perform a complicated 3D displacement motion is prevented.

Figure 4A:
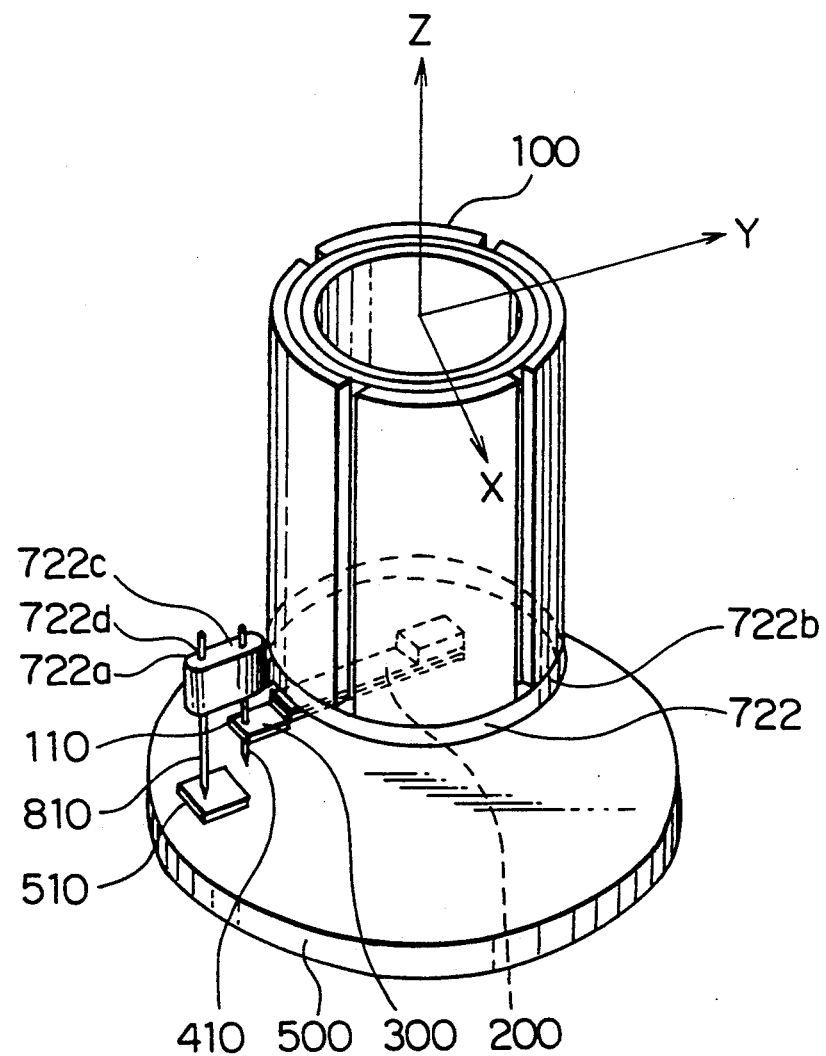
FIGS. 4A and 4B are respectively perspective and cross sectional views which illustrate a fourth embodiment of a fine scanning mechanism according to the present invention.
Figure 4B:
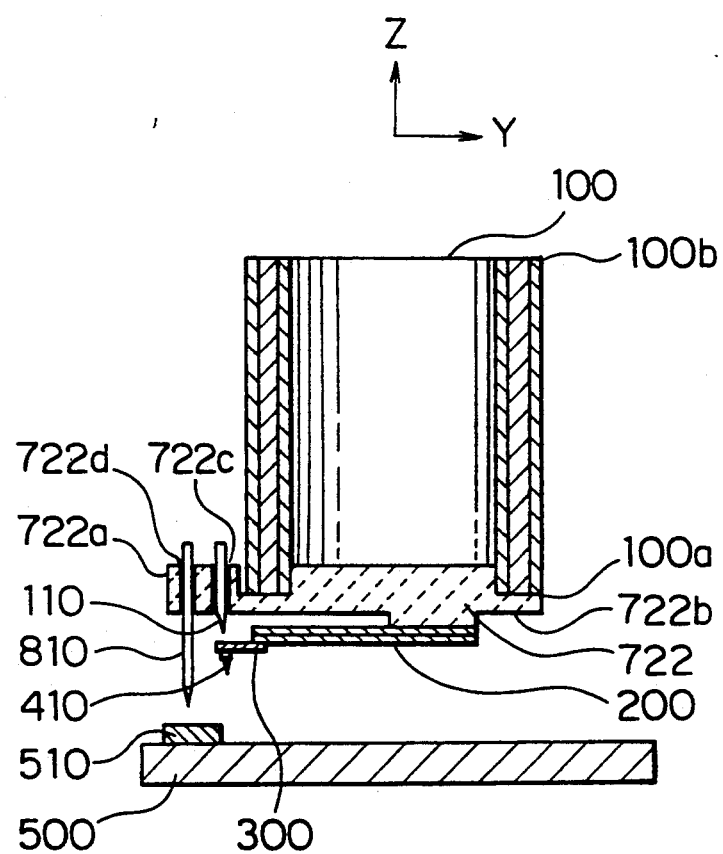

A fourth embodiment of the fine scanning mechanism according to the present invention will be described with reference to FIGS. 4A and 4B. According to the fourth embodiment, a third probe 810 is further attached, to a first probe and bimorph attaching portion 722 is made of a continuously formed material. The first probe and bimorph attaching portion 722 comprises a disc-like stationary portion 722b and a first and third probe holding portion 722a positioned outside the cylindrical piezoelectric element 100. The peripheral portion of the stationary portion 722b is secured to the peripheral portion of the free end 100a of the cylindrical piezoelectric element 100 is achieved. by, for example, an adhesive. The first and third probe holding portion 722a has a portion 722c to which the first probe 110 is attached and a portion 722d to which the third probe 810 is attached and which is formed outside the portion 722c. The first and third probes 110 and 810 are attached to the corresponding portions 722c and 722d.

The third probe 810 is disposed farther away from the axis of the cylinder of the cylindrical piezoelectric element 100 than the first and second probes 110 and 410. As a result, the third probe 810 is able to vertically opposes the surface of the sample 510 without obstruction. For example, when the third probe 810 is attached to the corresponding portion 722d in such a manner that the front portion of the third probe 810 is positioned adjacently the surface of the sample 510 rather the front portion of the second probe 410, the front portion of the third probe 810 performs 3D displacement motion on the surface of the sample 510 in synchronization with the free end 100a of the cylindrical piezoelectric element 100.

According to the fourth embodiment, the fine scanning mechanism can be used to act as a scanning tunnelling microscope (STM) as well as the AFM. A bias voltage is applied between the third probe 810 and the sample 510 while the third probe 810 and the sample 510 are brought close to each other by the rough adjustment mechanism 600 shown in FIGS. 1E and 1H so that a triangular voltage is applied to the cylindrical piezoelectric element 100. Furthermore, the piezoelectric element 100 is Z directionally controlled so as to place the distance from the third probe 810 to the sample 510 to be the tunnel region and the tunneling current to be maintained at a predetermined level. When the quantity of XY scanning and the quantity of the feedback in the direction Z are displayed by a display device, the image of the sample 510 observed by the STM is displayed. Electric connection members such as electric lead wires and soldering elements provided for the purpose of applying the bias voltage to the third probe are omitted from the illustration. In a case where the fine scanning mechanism is used as that for the AFM, the third probe 810 must be withdrawn from the portion 722d or the third probe 810 is positioned in such a manner that its front portion is farther away from the sample 510 than the second probe 410.

Figure 5A:
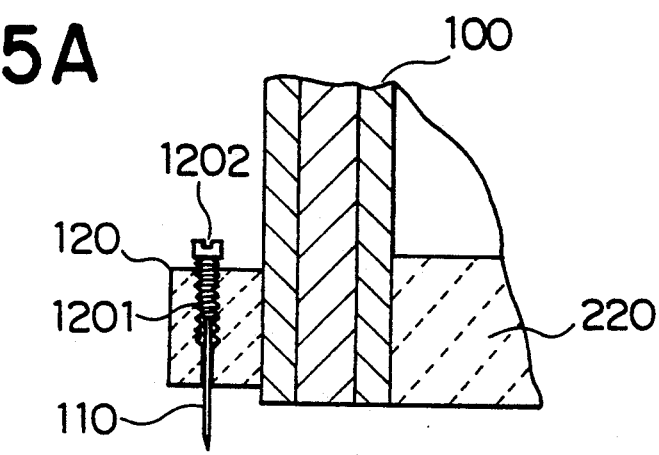
FIG. 5A is a partial cross sectional view which illustrates a fifth embodiment of the fine scanning mechanism.

A fifth embodiment of the fine scanning mechanism according to the present invention will be described with reference to FIG. 5A. The fifth embodiment is arranged in such a manner that a female thread portion 1201 is formed in the first probe attaching portion 120 according to the first embodiment in such a manner that it is positioned coaxially with the first probe 110 and a male screw 1202 is screwed into the female thread portion 1201. When the male screw 1202 is rotated, the first probe 110 in contact with the male screw 1202 is pushed forward so that the front portion of the first probe 110 approaches the cantilever (omitted from the illustration).

According to the fifth embodiment, when the male screw 1202 is rotated, the front portion of the first probe 110 can easily be positioned within a range of the one-dimensional displacement which can be adjusted by the voltage EO to be applied to the displacement bimorph piezoelectric element 200. In consequence, the tunnel region can assuredly be formed by the voltage VO to be applied to the displacement bimorph piezoelectric element 200. If the displacement bimorph piezoelectric element 200 comprises a type which is able to move by a distance of 15 μm when a voltage of 60 V is applied, it is very difficult to cause the front portion of the first probe 110 held by a pincette to approach the cantilever 300 within the abovedescribed distance of 15 μm. However, when the male screw 1202 according to the fifth embodiment is rotated, the first probe 110 can easily approach as described above. As the male screw 1202, a machine screw M1 (JIS B1101) having a pitch of 250 μm is used. The female thread portion 1201 may have a corresponding female thread partially formed in the first probe attaching portion 120.

A method of attaching the first probe 110 will be detail. A metal capillary, the outer diameter of which is 0.75 mm and the inner diameter of which is 0.4 mm is fitted to the first probe attaching portion 120, the metal capillary being arranged in such a manner that, for example, a lead wire can be soldered thereto. Then, the first probe 110 bent to form a U-shape facing side by a certain degree is inserted into the capillary. Furthermore, the male screw 1202 is rotated while observing between the first probe 110 and the cantilever 300 with a magnifier or a stereomicroscope so as to make the front portion of the first probe 110 approach the cantilever 300. Then, the male screw 1202 is rotated reversely or it is removed. As a result, the first probe 110 is left in the capillary and the contact between the male screw 1202 and the first probe 110 is broken. Therefore, the positional deviation of the first probe 110 due to a lapse of time caused by unlocking and shakiness of the male screw 1202 can be prevented. Furthermore, the vibration of the first probe 110 transmitted from the outside via the male screw 1202 is prevented.

Figure 5B:
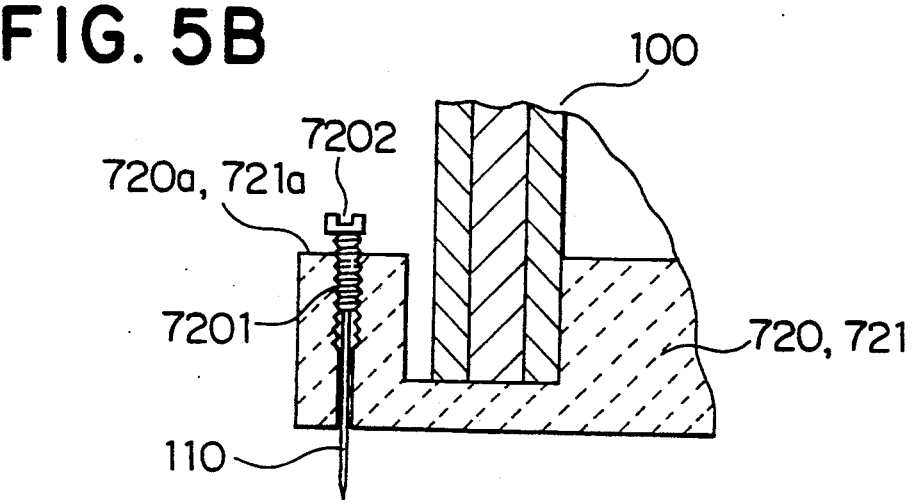
FIGS. 5B to 5F are partial cross sectional views which respectively illustrate modifications to the fifth embodiment.
Figure 5C:
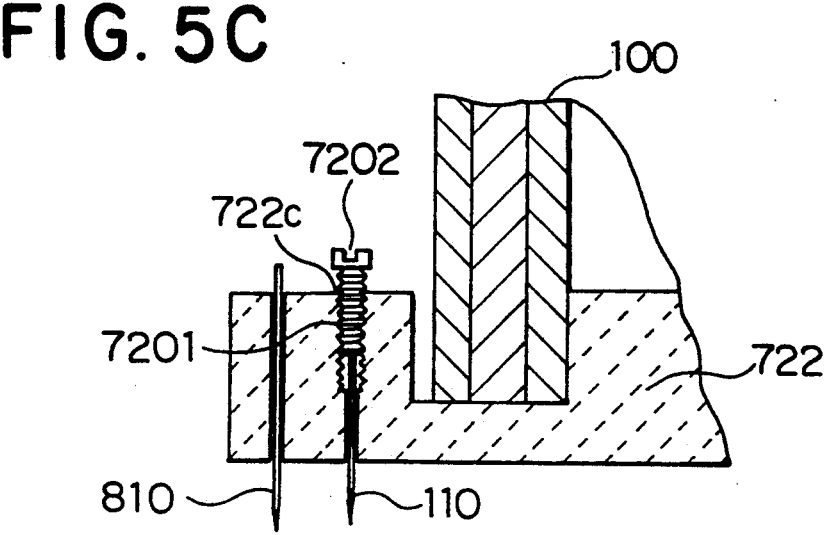

Modifications to the fifth embodiment of the present invention will be described with reference to FIGS. 5B to 5C. According to the modification shown in FIG. 5B, a female thread portion 7201 is formed in each of the first probe holding portions 720a and 721a of the first probe and bimorph attaching portions 720 and 721 according to the second and third embodiments. A male screw 7202 is screwed into the female thread portion 7201. According to the modification shown in FIG. 5C, the female thread portion 7201 is formed in the first probe attaching portion 722c of the first probe and bimorph attaching portion 722 according to the fourth embodiment. The male screw 7202 is screwed into the female thread portion 7201. According to those modifications, effects similar to the fifth embodiment can be obtained. The third probe 810 shown in FIG. 5C can be attached by the method of attaching the first probe 110 according to the fifth embodiment.

Figure 5D:
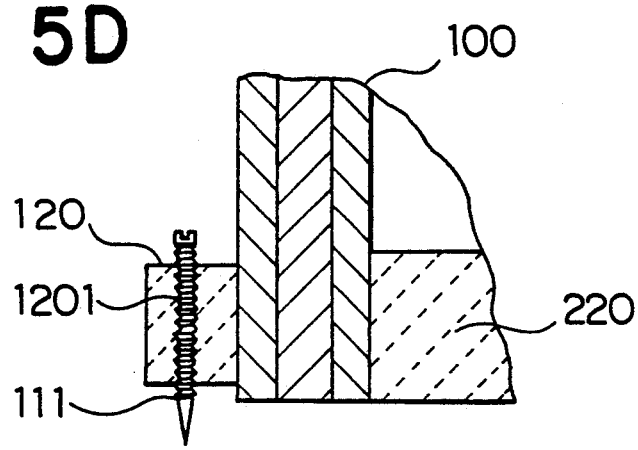
Figure 5E:
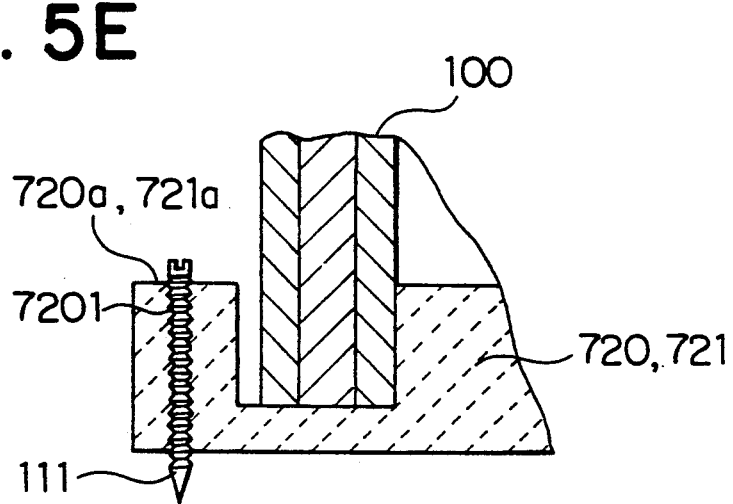
Figure 5F:
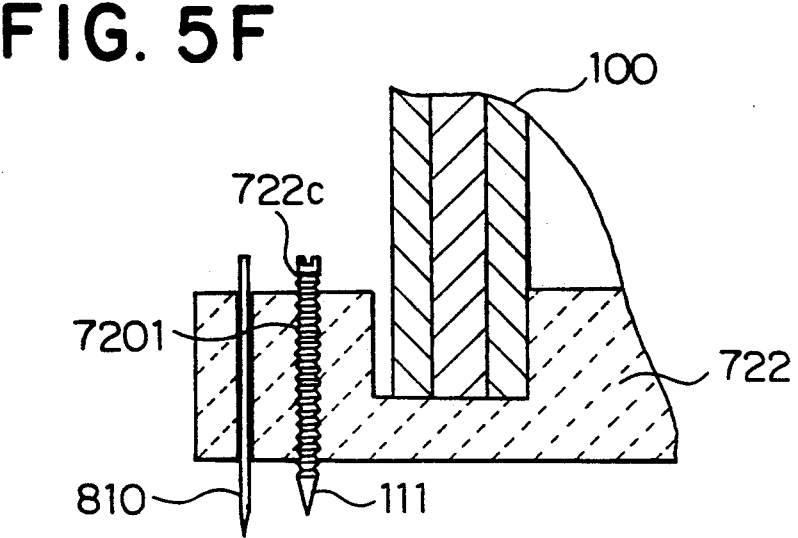

As shown in FIGS. 5D to 5F, a first probe 111 of a slot type having a thread on the side surface thereof may be screwed into the female threads 1201 and 7201. When the first probe 111, which is the male screw, is rotated, the front portion of the first probe 111 approaches the cantilever 300.

As the first probe 111 on which the male thread is formed, a metric coarse thread (JIS B0205) of a pitch of 0.25 mm is formed on the side surface of a tungsten (W) rod the diameter of which is 1 mm before a slot having a width of, for example, 0.32 mm and a depth of 0.35 mm is formed at a front portion thereof so as to be rotated by a screw driver. Furthermore, the other front portion is sharpened by machining or electropolishing.

According to the modifications shown in FIGS. 5D to 5F, the length of the screw fixing portion can be satisfactorily lengthened. Therefore, the first probe 111 can be attached to the first probe attaching portion 120 or the first probe and bimorph attaching portion 720 to 722 without loosening and shakiness.

Figure 6A:
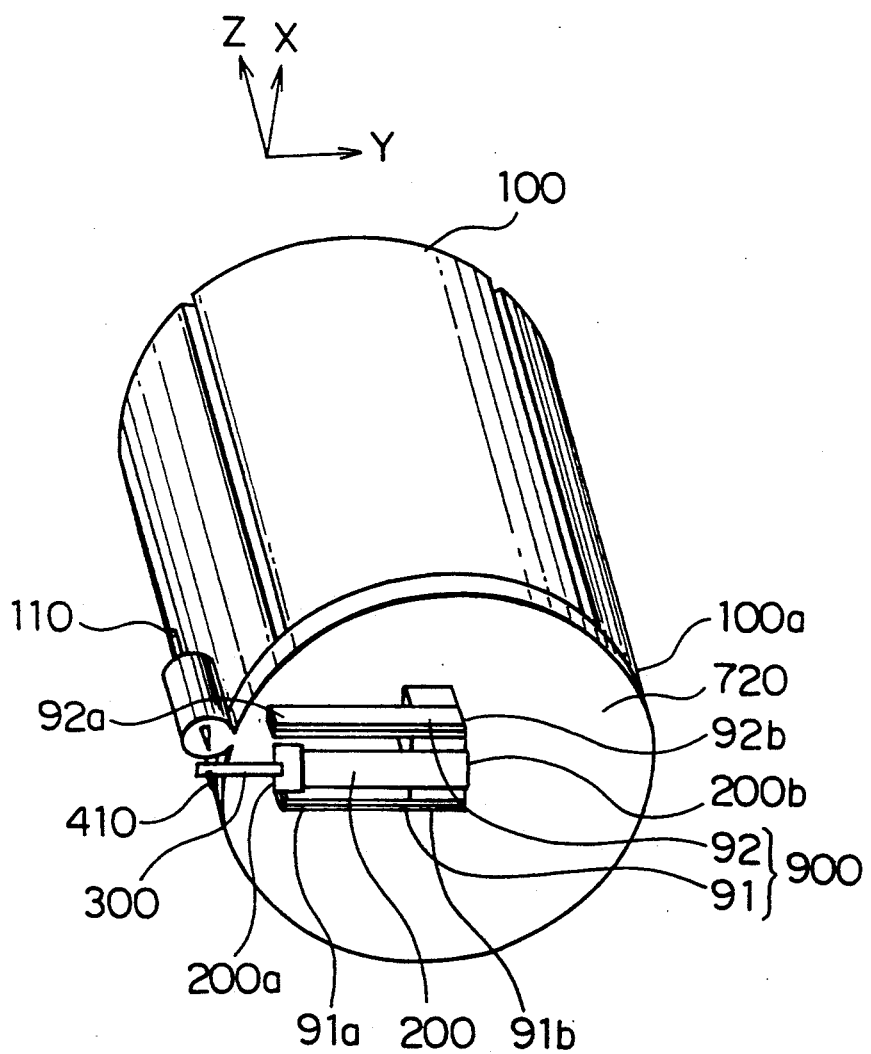
FIGS. 6A and 6B are respectively perspective and cross sectional views which illustrate a sixth embodiment of a fine scanning mechanism according to the present invention.
Figure 6B:
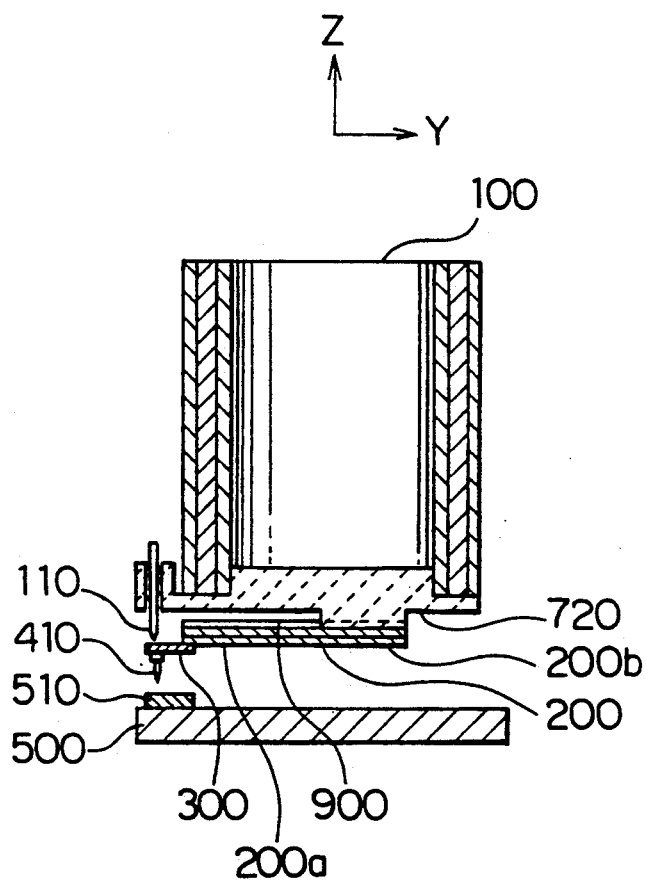

A sixth embodiment of the fine scanning mechanism according to the present invention will be described with reference to FIGS. 6A and 6B. According to the sixth embodiment, a holding piezoelectric element 900 for mechanically holding the free end 200a of the displacement bimorph piezoelectric element 200 to serve hold the cantilever attaching portion 320 is provided for the first probe and bimorph attaching portion 720.

As the holding piezoelectric element 900, for example, a pair of parallel holding bimorph piezoelectric elements 91 and 92 are employed. The pair of parallel holding bimorph piezoelectric elements 91 and 92 are displaced in parallel to the displacement bimorph piezoelectric element 200 in the direction of the Y axis of FIG. 6A. The stationary ends 91b and 92b of the holding bimorph piezoelectric elements 91 and 92 are attached to the first probe and bimorph attaching portion 720 at a position adjacent to a portion in which the stationary end 200b of the displacement bimorph piezoelectric element 200 is attached.

Figure 6C:
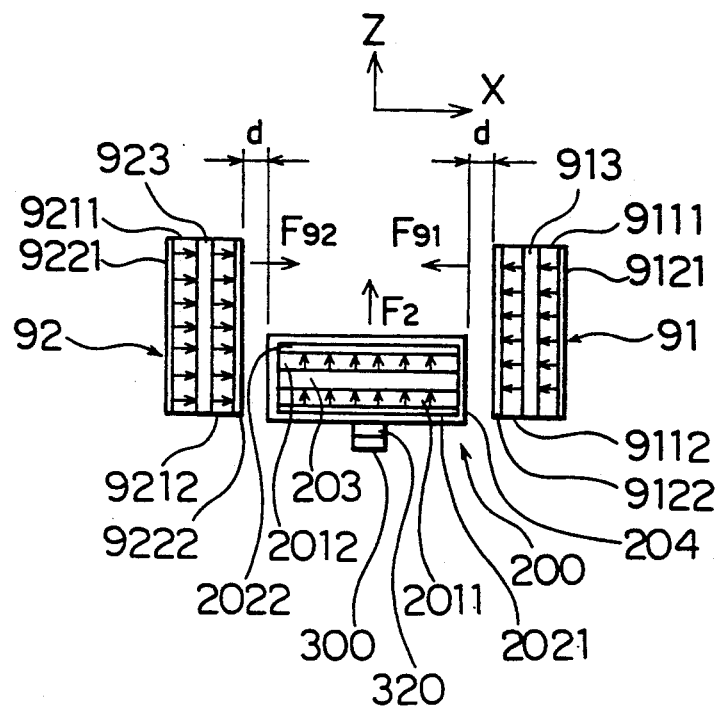
FIG. 6C is a partial cross sectional view of the sixth embodiment.

As shown in FIG. 6C, the holding bimorph piezoelectric elements 91 and 92 each comprise a pair of piezoelectric materials 9111, 9112 and 9211, 9212 formed on respective sides of corresponding elastic plates 913 and 923. Furthermore, electrodes 9121, 9122, 9221 and 9222 are formed on the corresponding piezoelectric materials 9111, 9112, 9211 and 9212. The piezoelectric materials 9111 and 9211 are subjected to a polarization treatment in a transverse effect mode in which the direction from the electrodes 9121 and 9221 toward the elastic plates 913 and 923 is the direction of polarization and the direction of distortion and the direction of polarization are perpendicular to each other. Furthermore, the piezoelectric materials 9112 and 9212 are subjected to a polarization treatment in a transverse effect mode in which the direction from the elastic plates 913 and 923 toward the electrodes 9122 and 9222 is the direction of polarization and the direction of distortion and the direction of polarization are perpendicular to each other. In each of the piezoelectric elements 200, 91 and 92, the pair of electrodes 2021 and 2022, the pair of electrodes 9121 and 9122 and the pair of electrodes 9221 and 9222 are respectively electrically connected to each other in such a manner that the conjunction portion is at a positive potential. Furthermore, the elastic plates 203, 913 and 923 are at the negative potential. When a voltage is applied to the thus arranged structure, the free end 200a of the displacement bimorph piezoelectric element 200 is displaced by a quantity F2 in the direction illustrated Furthermore, the free ends 91a and 92a of the holding bimorph piezoelectric elements 91 and 92 are also displaced by quantities F91 and F92 in directions illustrated. That is, the direction of the displacement of the free ends 91a and 92a of the pair of holding bimorph piezoelectric elements 91 and 92 are opposite each other. Electric connection members such as electric lead wires and soldering elements provided for the purpose of applying operating voltages to the electrodes and the elastic plate are omitted from the illustration.

An insulator 204 made of an electrically insulating material such as a machinable ceramic in the form of a cap shape is attached to the free end 200a of the displacement bimorph piezoelectric element 200 in such a manner that the insulator surrounds the free end 200a. The distance d from the insulator 204 to the free ends 91a and 92a of the corresponding holding bimorph piezoelectric elements 91 and 92 is smaller than the displacement quantities F91 and F92 of the corresponding holding bimorph piezoelectric elements 91 and 92.

The holding bimorph piezoelectric elements 91 and 92 act as follows. The voltage applied to the displcement bimorph piezoelectric element 200 is enlarged when no voltage is applied to the holding bimorph piezoelectric elements 91 and 92, no atomic force acts between the second probe 410 and the sample 510 and no deflection takes place in the cantilever 300. Subsequently, the distance between the free end 300a of the cantilever 300 and the probe 110 is shortened in such a manner that the above-described distance falls within the tunnel region and a tunneling current flowing there is made to be a predetermined level. The voltage applied to the displacement bimorph piezoelectric element 200, when the tunneling current flowing as described above becomes the predetermined level, is permanently maintained. Furthermore, a voltage is applied to the holding bimorph piezoelectric elements 91 and 92 so as to cause the displacement quantity F91 and F92 of the free ends 91a and 92a to be larger than the initial distance d. In consequence, the free end 200a of the displacement bimorph piezoelectric element 200 is held fixed by the free ends 91a and 92a of the holding bimorph piezoelectric elements 91 and 92 via the insulator 204 as desired.

When a triangular voltage is applied to the cylindrical piezoelectric element 100 in this state, the free end 100a of the cylindrical piezoelectric element 100, the free end 200a of the isplacement bimorph piezoelectric element 200, the free end 300a of the cantilever 300, the first probe 110 and the second probe 410 synchronize with one another. In consequence, the second probe 410 two-dimensionally scans the surface of the sample 510 attached to the sample tray 500.

The second probe 410 and the sample 510 are brought lose to each other by using the rough adjustment mechanism 600 as described with reference to FIGS. 1E to IH so that the atomic force acts between the second probe 410 and the sample 510. Furthermore, the Z directional motion of the cylindrical piezoelectric element 100 is controlled so as to cause the tunneling current flowing between the free end 300a of the cantilever 300 and the first probe 110 to be maintained at a predetermined value. Subsequently, the quantity of the XY planar scanning and the quantity of the feedback in the direction Z are displayed on a display device so that the image of the surface of the sample 510 observed by the AFM is obtained.

The holding bimorph piezoelectric elements 91 and 92 may be made to have the same dimensions and made of the same material as the displacement bimorph piezoelectric element 200.

According to the sixth embodiment, the free end 200a of the displacement bimorph piezoelectric element 200 is held by the holding bimorph piezoelectric elements 91 and 92 via the insulator 204. Therefore, if the above-described charge control system is also employed, hysteresis and creep of the displacement bimorph piezoelectric element 200 can be eliminated. That is, the undesirable change in the tunneling current after a lapse of time and deterioration in the reproducibility of the applied voltage to achieve the tunnel region is prevented. According to this embodiment, the distance from the first probe 110 to the cantilever 300 can easily be maintained to be within the tunnel region because the displacement bimorph piezoelectric element 200 is in the form of a cantilever and has a free end 200a which supports the cantilever 300.

Figure 6D:
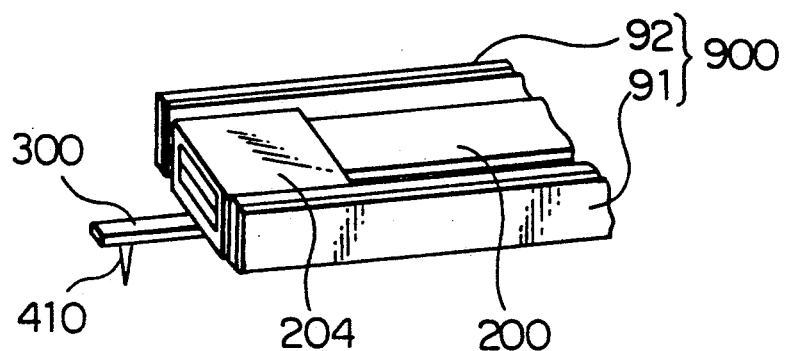
FIGS. 6D and 6E are respectively partial perspective and perspective views which illustrate modifications to the sixth embodiment.
Figure 6E:
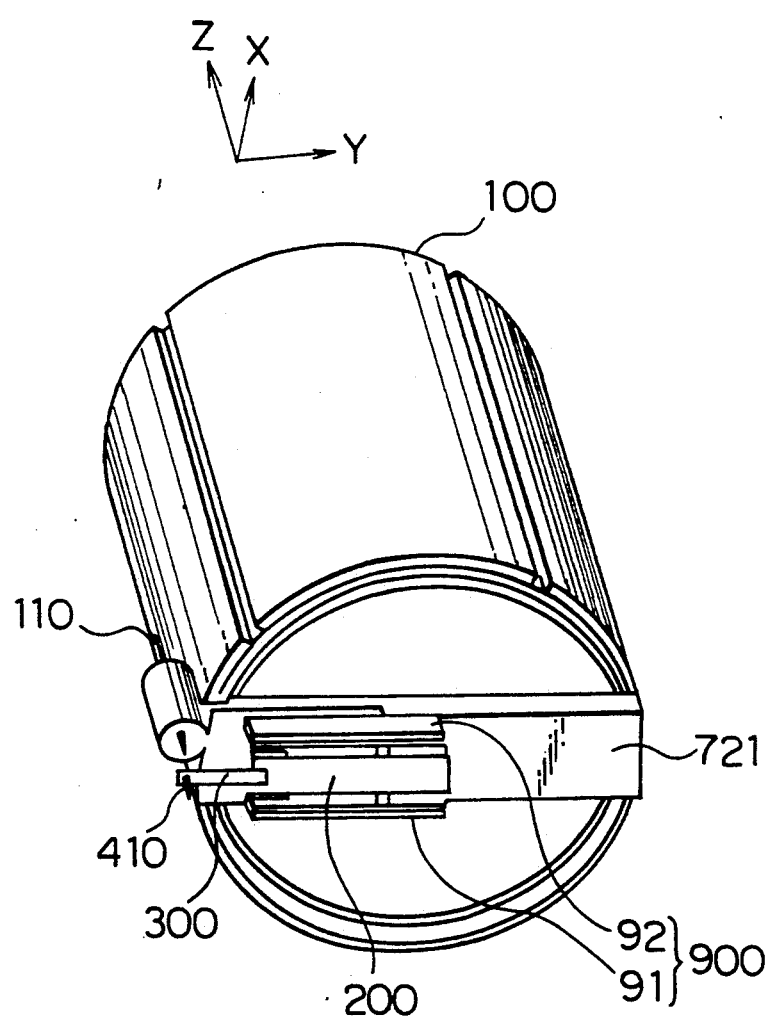

As shown in FIG. 6D, the cantilever 300 may be directly attached to the insulator 204.

Furthermore, the holding bimorph piezoelectric elements 91 and 92 and the like may be provided for the bridge-like first probe and bimorph attaching portion 721 according to the third embodiment.

Figure 7A:
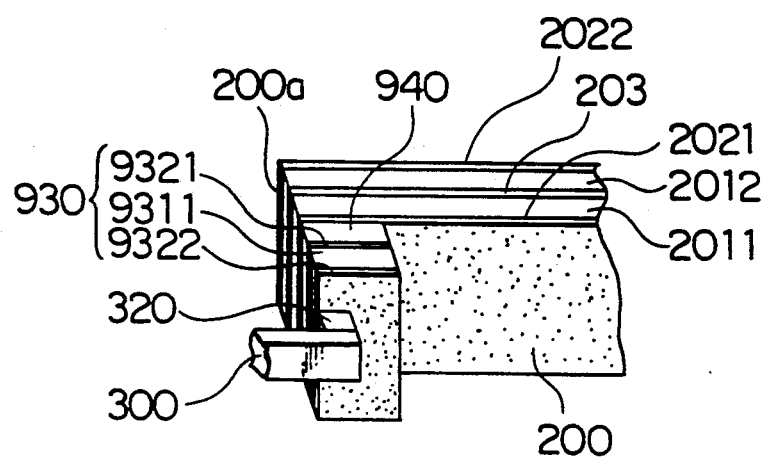
FIGS. 7A and 7B are respectively partial perspective and partial cross sectional views which illustrate a seventh embodiment of the fine scanning mechanism.

A seventh embodiment of the fine scanning mechanism according to the present invention will be described with reference to FIG. 7A. According to the seventh embodiment, a fine adjustment piezoelectric element 930 for precisely adjusting the position of the cantilever attaching portion 320 is provided for the free end 200a of the displacement bimorph piezoelectric element 200.

Figure 7B:
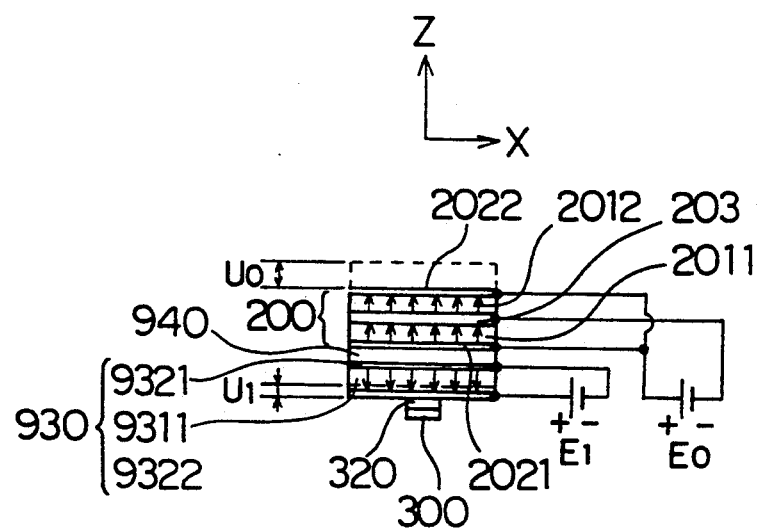

The fine adjustment piezoelectric element 930 comprises a square plate type piezoelectric element in the form of a single layer and formed to act in a vertical effect mode, the fine adjustment piezoelectric element 930 being disposed between a fine adjustment piezoelectric element attaching portion 940 attached to the free end 200a of the displacement bimorph piezoelectric element 200 and the cantilever attaching portion 320. The fine adjustment piezoelectric element 930 comprises a piezoelectric material 9311 and electrodes 9321 and 9322. The piezoelectric material 9311 is subjected to a polarization treatment in the vertical effect mode in which the direction from the electrode 9321 toward the electrode 9322 is the direction of polarization and the direction of distortion and the direction of polarization are the same as shown in FIG. 7B.

The electrodes 2021 and 2022 of the displacement bimorph piezoelectric element 200 are electrically connected to each other, and voltage Eo is applied between the above-described electrodes 2021 and 2022 with electrodes 2021 and 2022 positive and the elastic plate 203 to be the negative. As a result, the free end 200a is onedimensionally displaced by u0 in the direction Z with respect to the stationary end 200b. When voltage E: is applied between the above-described electrodes 9322 of the fine adjustment piezoelectric element 930 the electrode 9322 is one-dimensionally displaced by u1 in the direction Z with respect to the fine adjustment piezoelectric attaching portion 940. In consequence, when voltages are respectively applied to the displacement bimorph piezoelectric element 200 and the fine adjustment piezoelectric element 930, the electrode 9322 is onedimensionally displaced by u = u0 +u1 in the direction Z from the stationary end 200b of the displacement bimorph piezoelectric element 200. Electric connection members such as electric lead wires and soldering elements provided for the purpose of applying operating voltages to the electrodes 9321 and 9322 are omitted from FIG. 7A.

The fine adjustment piezoelectric element 930 is formed to have a length of, for example, 1 mm, a width of 2 mm and a thickness of 0.3 mm. Furthermore, the quantity of one-dimensional displacement u1 at the applied voltage of 10 V is 40 angstrom. The piezoelectric material 9311 has a thickness of 0.2 mm and is made of a titanate zirconate (Pb(Zr-Ti)03) having an electrostriction constant $d_{33} = 400 \times 10^{-12}$ m/V and a Curie temperature of about 200° C. The electrodes 9321 and 9322 have a thickness of about 3 $\mu$m by printing silver (Ag) or electroless plating of nickel (Ni). The fine adjustment piezoelectric element attaching portion 940 is made of an electrically insulating material such as a machinable ceramic.

Figure 7C:
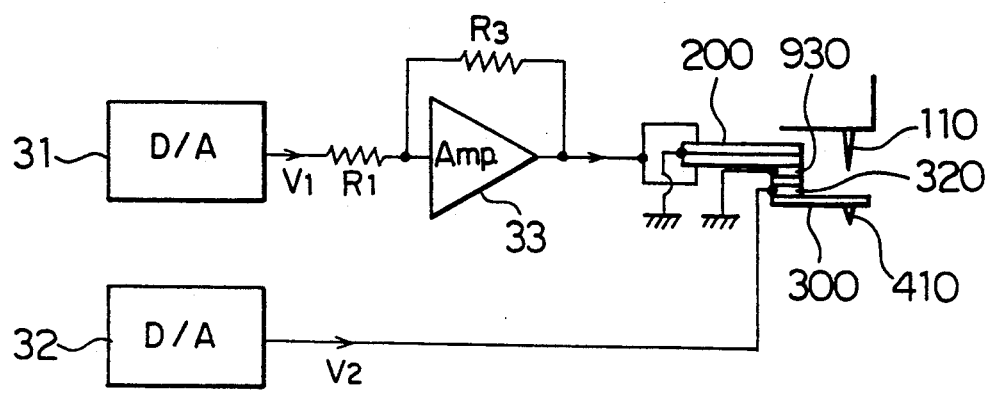
FIG. 7C is a block diagram for an electric circuit for operating the structure according to the seventh embodiment.
Figure 7D:
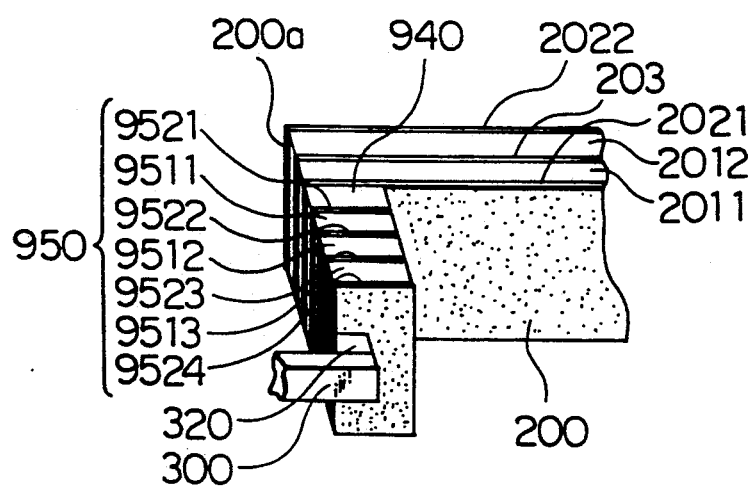
FIGS. 7D and 7E are respectively partial perspective and partial cross sectional views which illustrate a modification to the seventh embodiment.

The operation and the effect obtainable from the seventh embodiment will be described with reference to FIG. 7C. A 16-bit D/A converter 31 the maximum output voltage V1 of which is $\pm 10$ V is connected to the operational amplifier circuit 33 via the resistor R:, the D/A converter 31 being controlled by a computer. Furthermore, a resistor R3 is connected in parallel with the operational amplifier circuit 33. The resistors R1 and R3 are arranged so as to cause the output from the D/A converter 31 to be amplified at a voltage amplification rate 15.

When the displacement bimorph piezoelectric element 200 comprises an element the movable distance of which at the applied voltage of 60 V is, for example, 15 $\mu$m and the maximum voltage which can be applied thereto is 150 V, the voltage output from the operational amplifier circuit 33 can be varied up to 150 V in units of 15 mV if the output voltage V1 from the D/A converter 31 is changed in units of 1 mV. That is, the displacement quantity u0 of the displacement bimorph piezoelectric element 200 can be varied up to 37.5 $\mu$m in units of 37.5 angstrom.

A 16-bit converter 32 the maximum output voltage V2 of which is $\pm 10$ V and which is controlled by the computer, is connected to the fine adjustment piezoelectric element 930 so that the output V2 is applied to the fine adjustment piezoelectric element 930. Since the quantity of displacement of the fine adjustment piezoelectric element 930 per unit voltage applied is 4 angstrom/V, the displacement quantity u1 of the fine adjustment piezoelectric element 930 can be varied up to 40 angstrom in units of 0.004 angstrom if the applied voltage V2 is changed in units of 1 mV.

Therefore, displacement of 37.5 angstrom of the displacement bimorph piezoelectric element 200 realized when the output voltage V; from the D/A converter 31 changed by 1 mV is within the range in which the fine adjustment piezoelectric element 930 can be changed by the output V; from the D/A converter 32. That is, the distance from the first probe 110 to the cantilever 300 can be precisely changed by utilizing the synthesized displacement quantity u = u0 +u1 of the displacement bimorph piezoelectric element 200 and the fine adjustment piezoelectric element 930.

The fine adjustment piezoelectric element 930 reveals an advantage in that the size is reduced, the displacement quantity per unit voltage applied is small and creep can be significantly prevented in comparison to the displacement bimorph piezoelectric element 200. Furthermore, the displacement bimorph piezoelectric element 200 reveals an advantage in that the displacement quantity for unit voltage applied is large. Therefore, when both the fine adjustment piezoelectric element 930 and the displacement bimorph piezoelectric element 200 are used, the distance from the first probe 110 to the cantilever 300 can easily be positioned in the tunnel region in a short time. According to the seventh embodiment change $\Delta V$ of the voltage which is applied to the displacement bimorph piezoelectric element 200 and which corresponds to the change $\Delta L$ of the distance between the free end 300a of the cantilever 300 and the first probe 110 when the cantilever 300 is deflected by the action of the atomic force between the second probe 410 and the sample 510 can be replaced by the voltage change applied to the fine adjustment piezoelectric element 930, which can be an extremely small change. Therefore, a fine scanning mechanism capable of observing small deflection of the cantilever 300, that is, capable of observing small atomic forces can be realized.

Figure 7E:
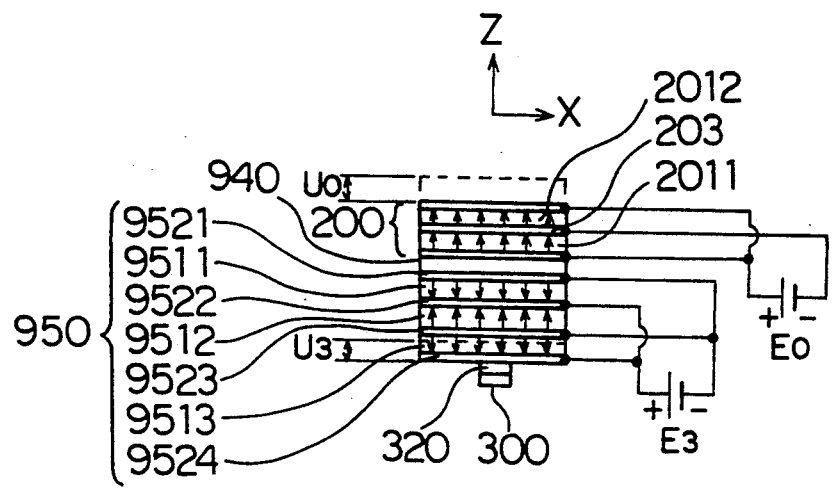

As an alternative to the fine adjustment piezoelectric element 930, a fine adjustment piezoelectric element 950 comprising a multi-layered, for example, three-layered square plate piezoelectric element may be employed. The fine adjustment piezoelectric element 950 comprises piezoelectric materials 9511 to 9513 and electrodes 9521 to 9524. As shown in FIG. 7E, the piezoelectric materials 9511 to 9513 are subjected to polarization treatment in the vertical effect mode. The which a direction shown by arrows in FIG. 7E is the direction of polarization. The direction of distortion and the direction of polarization are the same. Furthermore, the electrodes 9522 and 9524 of the fine adjustment piezoelectric element 950 are electrically connected to each other. Then, voltage E: is applied to the above-described electrodes 9522 and 9524 which are made positive potential and electrodes 9521 and 9523 which are electrically connected to each other at a negative potential. As a result, the electrode 9524 is one-dimensionally displaced by u3 in the direction Z with respect to the fine adjustment piezoelectric element attaching portion 940. Therefore, when voltages are respectively applied to the above-described displacement bimorph piezoelectric element 200 and the fine adjustment piezoelectric element 950, the electrode 9524 is one-dimensionally displaced by u = uo +u0 in the direction Z from the stationary end 200b of the displacement bimorph piezoelectric element 200.

In a case where the dimensions and the materials for each of the piezoelectric materials of the fine adjustment piezoelectric element 950 are the same as those for the fine adjustment piezoelectric element 930, the displacement quantity u1 becomes 3·u1, and the displacement quantity for unit voltage applied becomes 12 angstroms V. Similarly, when n layers of asquare plate type piezoelectric element are used, the displacement quantity un becomes n·u1. Therefore, the one-dimensional displacement quantity becomes larger, if the multi-layered square plate type piezoelectric element is used, than that realized when a single layer square plate piezoelectric element is used. In consequence, the distance between the first probe 110 and the cantilever 300 until it reaches the tunnel region can be widely be probed.

Figure 7F:
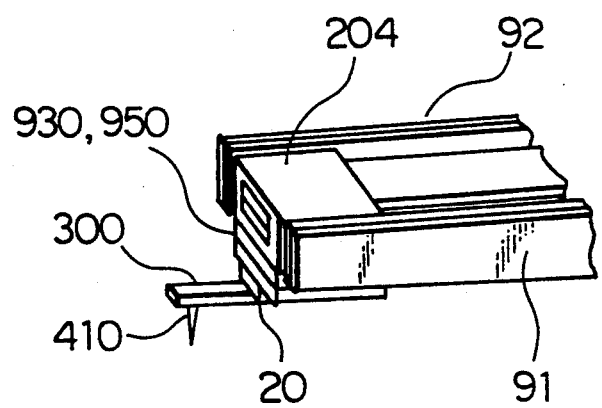
FIG. 7F is a partial perspective view which illustrates another modification to the seventh embodiment.

As shown in FIG. 7F, another structure is employed in which a cap-like insulator 204 made of an electrically insulating material, for example, a machinable ceramic is fastened to the free end 200a of the displacement bimorph piezoelectric element 200 in such a manner that the insulator 204 surrounds the free end 200a. Furthermore, the fine adjustment piezoelectric element 930 or 950 is attached to the insulator 204, and the insulator 204 is mechanically held between the pair of holding bimorph piezoelectric elements 91 and 92 to secure and hold the insulator 204. In a structure in which the free end 200a of the displacement bimorph piezoelectric element 200 is thus secured and held, the distance between the first probe 110 and the cantilever 300 can easily be placed into the tunnel region by the fine adjustment piezoelectric element 930 or 950 which greatly reduces creep and the change in distance per unit voltage applied is small.

Figure 8A:
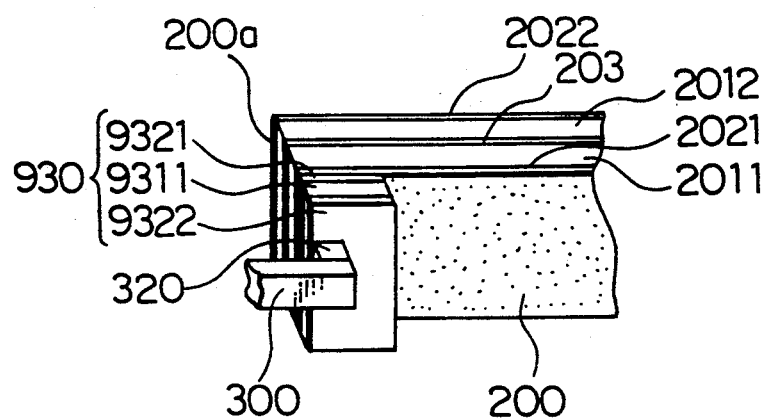
FIGS. 8A and 8B are respectively partially perspective and partial cross sectional views which illustrate an eighth embodiment of a fine scanning mechanism according to the present invention.
Figure 8B:
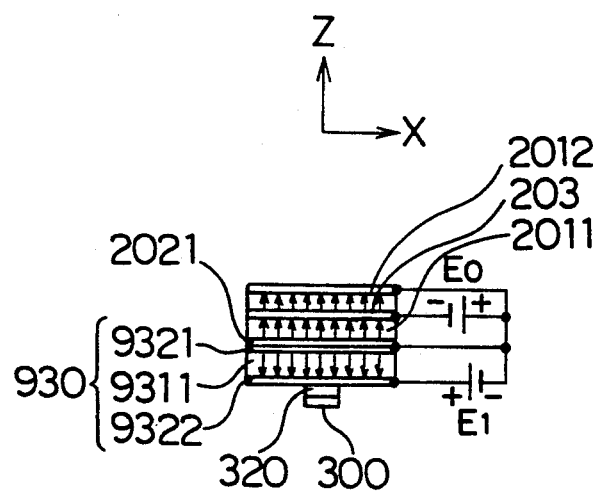

An eighth embodiment of the fine scanning mechanism according to the present invention will be described with reference to FIGS. 8A and 8B. According to the eighth embodiment, the electrode 9321 for applying voltage of the fine adjustment piezoelectric element 930 is electrically and mechanically connected by soldering or the like to the electrode 2021 for applying the voltage of the displacement bimorph piezoelectric element 200.

Figure 8C:
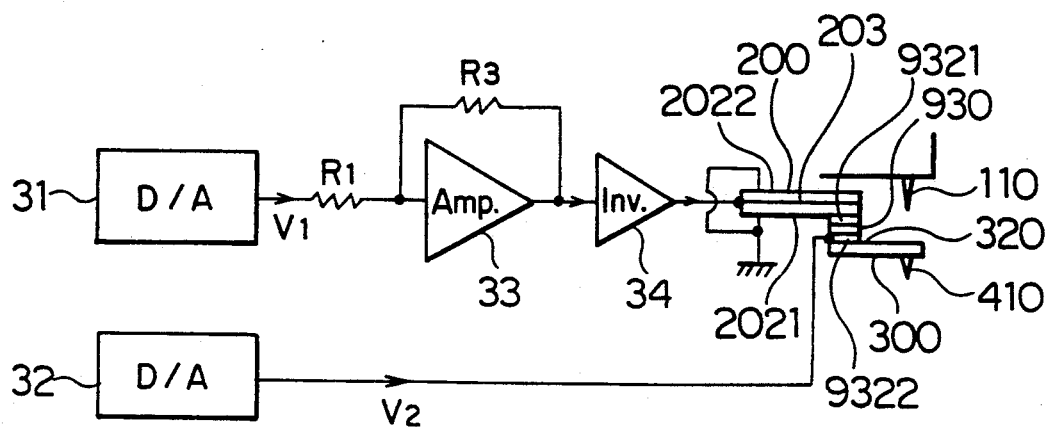
FIGS. 8C and 8D are block diagrams for electric circuits for operating the structure according to the eighth embodiment.
Figure 8D:
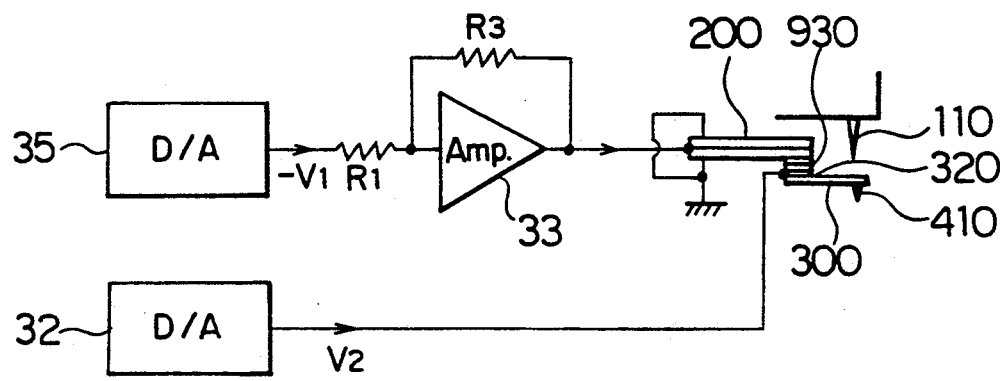

The operation of the structure according to the eighth embodiment is the same as that according to the seventh embodiment. In order to adjust the polarities of the voltages to be applied to the displacement bimorph piezoelectric element 200 and the fine adjustment piezoelectric element 930, however, the electrodes 2021 and 2022 of the displacement piezoelectric element 200 are earthed as shown in FIG. 8C. Furthermore, the operational amplifier circuit 33 is connected to the elastic plate 203 via an inverting voltage amplifier 34. In addition, the D/A converter 32 is connected to the electrode 9322 of the fine adjustment piezoelectric element 930. If the D/A converter 31 is replaced by a D/A converter 35 capable of transmitting inverted voltage −V1, the inverting voltage amplifier 34 can be omitted from the circuit.

Figure 8E:
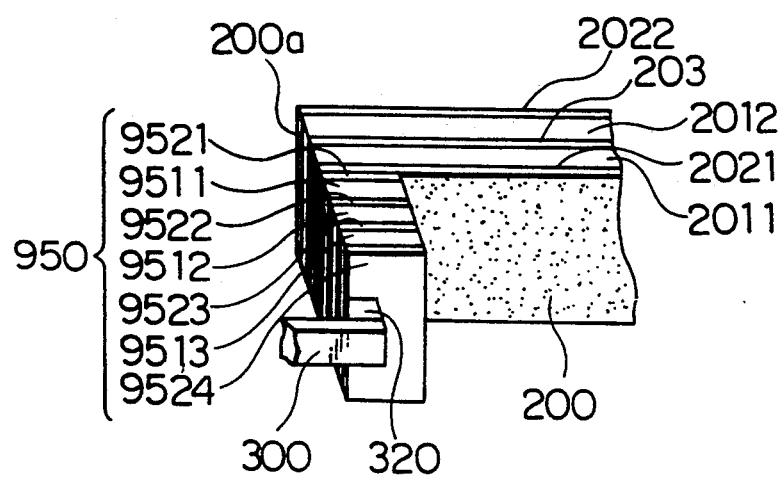
FIGS. 8E and 8F are respectively partial perspective and partial cross sectional views which illustrate a modification to the eighth embodiment.
Figure 8F:
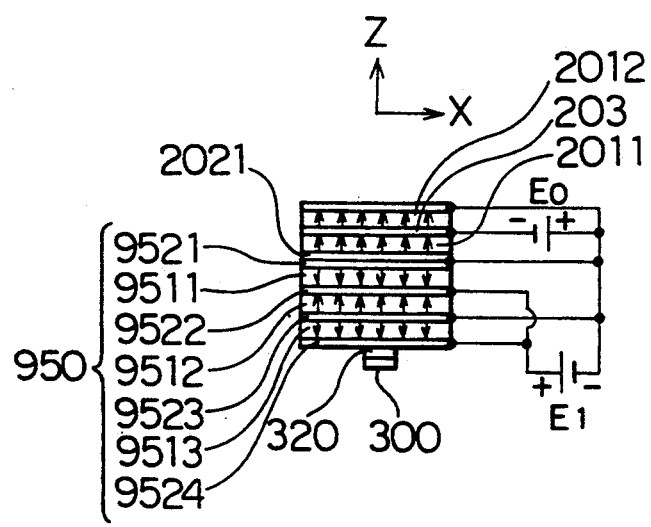
Figure 9A:
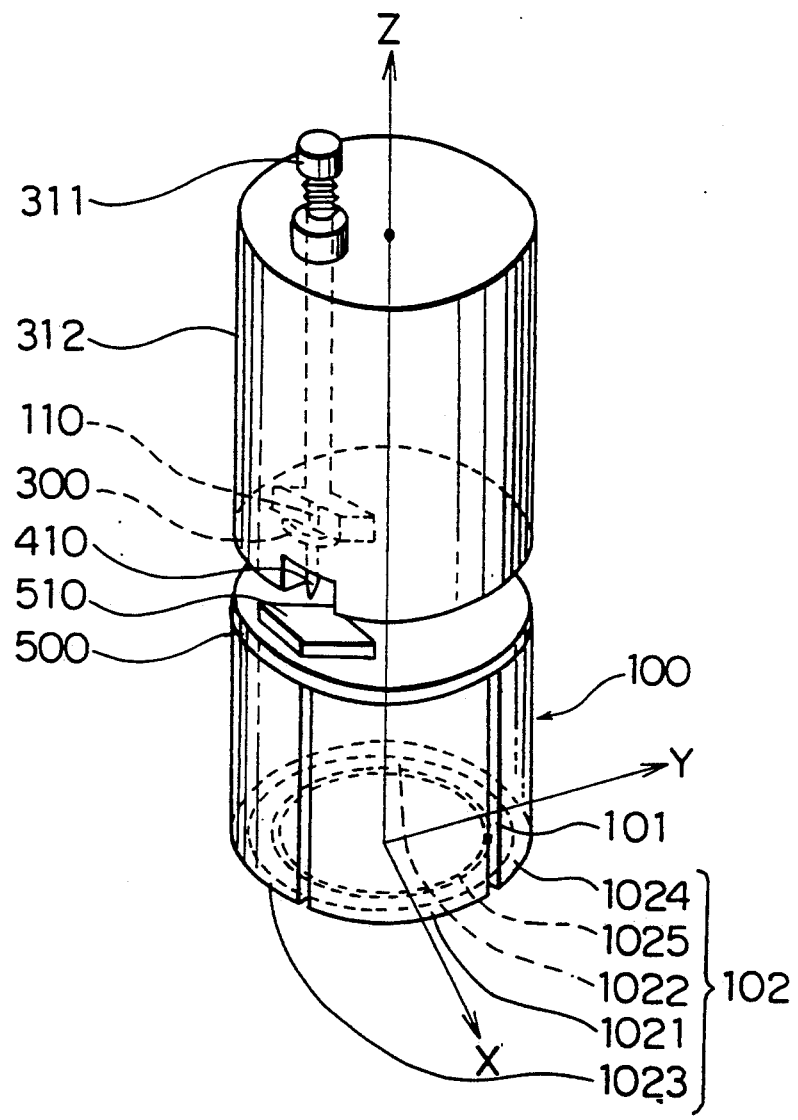
FIGS. 9A to 9E respectively illustrate conventional fine scanning mechanisms.
Figure 9B:
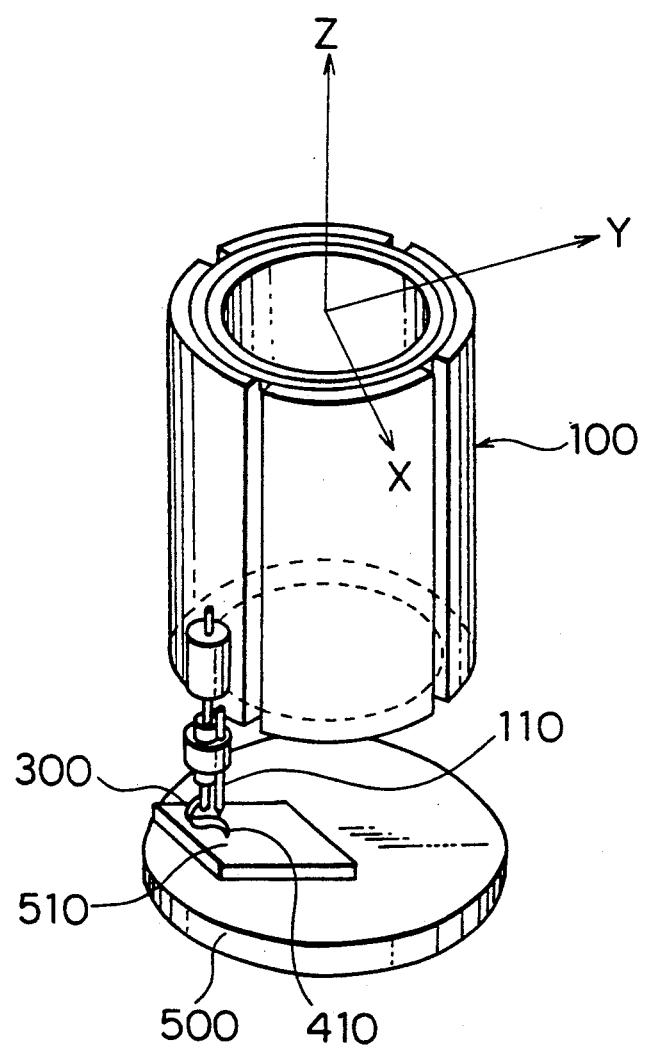
Figure 9E:
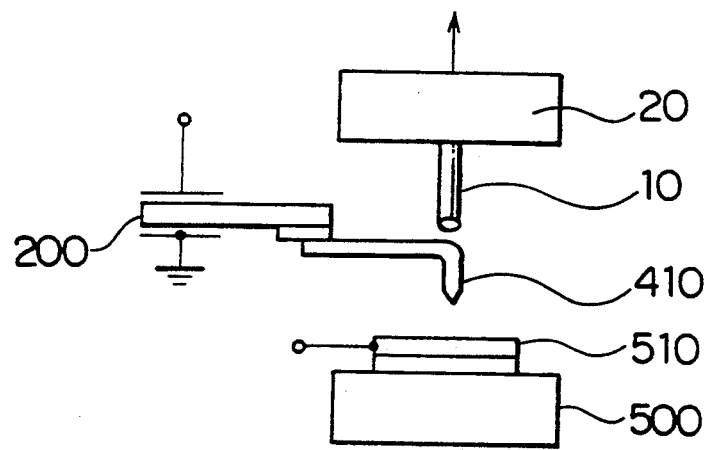
Figure 9C:
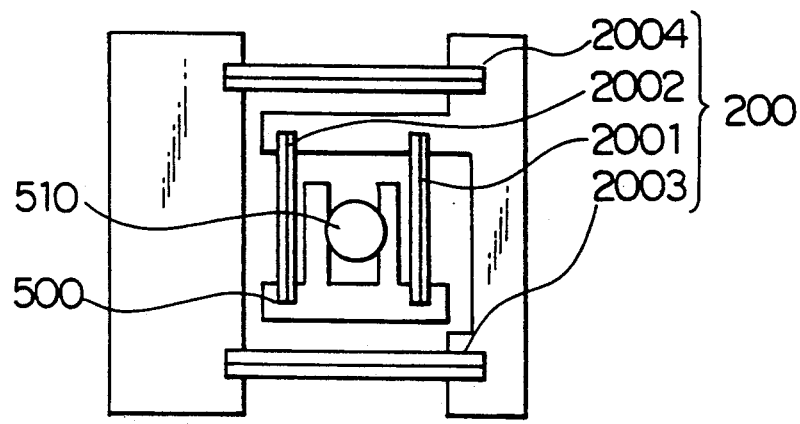
Figure 9D:
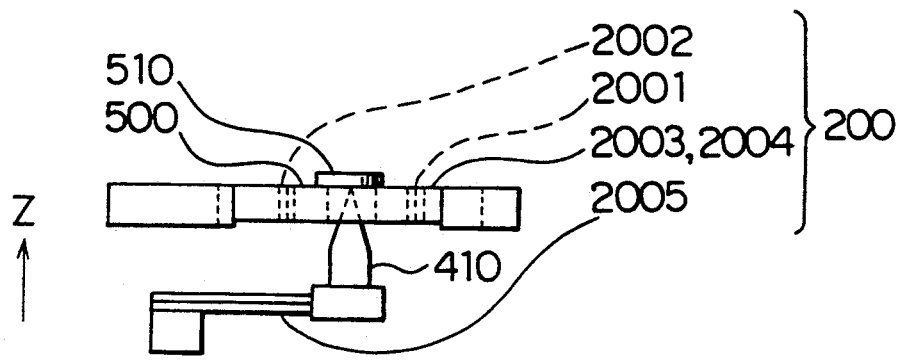

As shown in FIGS. 8E and 8F, the electrode 9521 of the fine adjustment piezoelectric element 950 and the electrode 2021 of the displacement bimorph piezoelectric element 200 may electrically and mechanically be connected to each other.

According to the eighth embodiment, the fine adjustment piezoelectric element attaching portion 940 according to the seventh embodiment is omitted from the structure. Therefore, the structure is simplified and the rigidity is improved. Furthermore, the fine scanning mechanism can be easily manufactured.

The polarities of the voltages to be applied to the electrodes of the displacement bimorph piezoelectric element 200 and the fine adjustment piezoelectric elements 930 and 950 and the electrically connecting methods according to the seventh and eighth embodiments are described as the examples. If the piezoelectric materials are subjected to the polarization treatment in a direction which is different from the directions according to the seventh and eighth embodiments, electric circuits and electrically connecting methods may be employed to correspond to the employed polarization treatment.

What is claimed is:

1. A fine scanning mechanism for an atomic force microscope comprising:
   a three-dimensionally displaceable cylindrical piezoelectric element having opposed fixed and free ends;
   a first probe attaching means for attaching a probe attached to a side of said cylindrical piezoelectric element proximate the free end;
   a first probe attached to said first probe attaching means;
   a bimorph piezoelectric element attaching means for attaching a bimorph piezoelectric element attached to a side of said cylindrical piezoelectric element proximate the free end;
   a one-dimensionally displaceable bimorph piezoelectric element attached to said bimorph piezoelectric element attaching means;
   a cantilever attaching means for attaching a cantilever attached to a side of the one-dimensionally displaceable bimorph piezoelectric element;
   a cantilever including a displacement portion and attached to said cantilever attaching means;
   a second probe attaching means for attaching a probe attached to a side of the displacement portion of said cantilever;
   a second probe attached to said second probe attaching means; and
   a stationary sample tray disposed opposite said second probe.

2. A fine scanning mechanism according to claim 1 wherein said first probe attachign means and said bimorph piezelectric element attaching means are a continuous member.

3. A fine scanning mechanism according to claim 2 wherein said bimorph piezoelectric element attaching means comprises a substantially circular member, said first probe attaching means is connected to said circular member, and said circular member is secured to the side of the three-dimensionally displaceable cylindrical piezoelectric element.

4. A fine scanning mechanism according to claim 2 wherein said bimorph peizoelectric element attaching means comprises a bridge-like member, said first probe attaching means is connected to said bridge-like member, and said bridge-like member is secured so that it intersects the central axis of said cylindrical piezoelectric element and joins two positions of the free end of the three-dimensionally displaceable cylindrical piezoelectric element.

5. A fine scanning mechanism according to claim 2 comprising a thrid probe attached to said first probe and to said bimorph piezoelectric element attaching means farther from the central axis of said cylindrical piezoelectric element than said first and second probes.

6. A fine scanning mechanism according to claim 1 whrein said first probe attaching means and said first probe include complementary, engaging threads.

7. A fine scanning mechanism according to claim 1 comprising a piezoelectric holding element for mechanically securing the one-dimensionally displaceable bimorph piezoelectric element.

8. A fine scanning mechanism according to claim 1 comprising a fine adjustment piezoelectric element interposed between the one-dimensionally displaceable displacement bimorph piezoelectric element and said cantilever attaching means for adjusting the one-dimensionally displaceable bimorph piezoelectric element relative to said cantilever attaching means.

9. A fine scanning mechanism according to claim 8 whrein said fine adjustment piezoelectric element includes at least two electrodes, said displacement bimorph piezoelectric element including an electrode electrically and mechanically connected to one of said two electrodes, and said cantilever attaching means is disposed on the other of said two electrodes.

10. A fine scanning mechanism according to claim 7 wherein said piezoelectric holding element comprises a pair of parallel bimorph piezoelectric elements holding said one-dimensionally displaceable displacement bimorph piezoelectric element.

11. A fine scanning mechanism according to claim 10 wherein said pair of bimorph piezoelectric elements are disposed parallel to said one-dimensionally displaceable bimorph piezoelectric element and are attached proximate the free end of the three-dimensionally displaceable cylindrical piezoelectric element adjacent to a fixed end of said one-dimensionally displaceable bimorph piezoelectric element.

12. A fine scanning mechanism according to claim 11 wherein said bimorph piezoelectric elements are disposed so that their displacements are opposite to each other.

13. A fine scanning mechanism according to claim 8 wherein said fine adjustment piezoelectric element is a vertical effect mode piezoelectric element.

14. A fine scanning mechanism according to claim 13 wherein said fine adjustment piezoelectric element is a single layer piezoelectric element.

15. A fine scanning mechanism according to claim 13 wherein said fine adjustment piezoelectric element is a multiple layer laminated piezoelectric element.

16. A fine scanning mechanism according to claim 1 wherein said cylindrical piezoelectric element outer piezoelectric bodies of a piezoelectric material disposed on the outer surface, each outer body being defined by edges parallel to the central axis of the cylindrical element, and a fifth piezoelectric material body disposed on the inner surface of said piezoelectric element.

16. A fine scanning mechanism according to claim 1 wherein said cylindrical piezoelectric element is tubular and includes inner and outer surfaces, first to fourth outer piezoelectric bodies of a piezoelectric material disposed on the outer surface, each outer body being defined by edges parallel to the central axis of the cylindrical element, and a fifth piezoelectric material body disposed on the inner surface of said piezoelectric element.

* * * * *